United States Patent [19]
Oehrli

[11] 3,986,121
[45] Oct. 12, 1976

[54] METHOD FOR REMOTE CONTROL THROUGH A POWER SUPPLY SYSTEM AND APPARATUS FOR CARRYING OUT THE SAME

[75] Inventor: Urs Oehrli, Zurich, Switzerland

[73] Assignee: Zellweger Uster Ltd., Uster, Switzerland

[22] Filed: May 13, 1974

[21] Appl. No.: 469,383

[30] Foreign Application Priority Data
May 18, 1973 Switzerland.................. 7118/73

[52] U.S. Cl.............................. 325/37; 340/310 A
[51] Int. Cl.².......................................... H04B 1/00
[58] Field of Search .............. 325/37, 64, 113, 394, 325/30, 163, 320, 63; 340/310 R, 310 A

[56] References Cited
UNITED STATES PATENTS

| | | | |
|---|---|---|---|
| 3,508,243 | 4/1970 | Nyfeler et al.................. | 340/310 A |
| 3,569,835 | 3/1971 | Harner........................... | 325/63 |
| 3,588,610 | 6/1971 | Stable ........................... | 340/310 R |
| 3,656,112 | 4/1972 | Paull ............................. | 340/310 R |
| 3,699,447 | 10/1972 | Frost.............................. | 325/45 |
| 3,806,876 | 4/1974 | Kniel et al..................... | 340/310 R |
| 3,835,389 | 9/1974 | Helfen ........................... | 325/64 |

Primary Examiner—Benedict V. Safourek
Assistant Examiner—Aristotelis M. Psitos
Attorney, Agent, or Firm—Werner W. Kleeman

[57] ABSTRACT

A method for remote-control through a power supply system, wherein at the transmitting end the control commands are superimposed upon a power line of the power supply system in the form of angle-modulated signals and are removed at any point of the power supply system for discrimination and subsequent evaluation according to their momentary frequency or phase.

An arrangement for carrying out the aforesaid method is also disclosed wherein a transmitter which can be modulated in its frequency or phase with the information corresponding to control commands is provided at the transmitting end. The transmitter is coupled through coupling means at the transmitting end to a power line of the power supply system used for transmission. At least one receiver is connected to at least one arbitrary point of the power supply system, the receiver comprising selecting means for the signals to be received, a frequency or phase discriminator following said selecting means, and an evaluating arrangement following the discriminator.

26 Claims, 19 Drawing Figures

| Us | $f_o$ | $D_1$ | $f'_o$ | $D_{21}$ | $D_{22}$ | $f_H$ | $D_2$ | $f_1$ | $f_2$ |
|---|---|---|---|---|---|---|---|---|---|
| 0 | 7.46 MHz | 100 | 74.6kHz | 1492 | - | 5000Hz | 600 | 124.333 Hz | |
| 1 | 7.54 MHz | 100 | 75.4kHz | - | 1508 | 5000Hz | 600 | | 125.666 Hz |

TRUTH TABLE

| n | A | B | C | D |
|---|---|---|---|---|
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 0 | 0 | 0 | 0 | 0 |

Fig. 12

SERIES COUPLING CIRCUIT

TRANSMISSION CHARACTERISTICS

METHOD FOR REMOTE CONTROL THROUGH A POWER SUPPLY SYSTEM AND APPARATUS FOR CARRYING OUT THE SAME

BACKGROUND OF THE INVENTION

The present invention relates to a new and improved method for remote control through a power supply system, and to an arrangement or apparatus for carrying out this method.

Various methods for remote control through a power supply system are already known in the art. One of the more widely used techniques is, for example, the technique known as ripple control in which a transmitter, preferably installed at a substation of an energy-supply network, superimposes control commands in the form of alternating-current signals or pulse sequences upon an associated power supply system. These control commands can be selectively received at any point of the power supply system by receivers connected to the power supply system. Ripple-control or remote control systems of this type can be used to switch certain groups of current consumers, such as boilers, street-lighting systems etc., on or off by remote control. Ripple-control systems of this kind also can be used for transmitting special-purpose commands, for example for fire fighting or air-warning purposes and so forth.

Although ripple-control techniques of the nature referred to above have generally proved to be satisfactory, considerable difficulties occasionally arise due to the fact that the control commands superimposed upon a power supply system not only spread out or propagate in a forward direction, i.e. in the direction of energy flow to the consumers associated with the particular substation, they also spill over backwards through feed transformers at the particular substation into a higher-order high-voltage network and, through this higher-order high-voltage network and through further feed transformers, pass undesirably into a power supply system associated with a neighboring substation. This fault occurs especially in cases where relatively low transmitting frequencies, for example in the order of 300 c/s, are used, because the aforementioned feed transformers in the substations only exhibit relatively low damping for frequencies as low as these. In view of the fact that the higher-order power supply system which represents the interfering transmission path, has a voltage of, for example, 50 KV or more and is designed for high outputs, it is obvious that frequency-selective blocking means become extremely expensive and also represent undesirable elements in terms of the operational reliability of power supply systems. In the absence of such blocking means, however, ripple-control or remote control receivers in an adjacent network would be in danger of responding falsely to control commands foreign to that network on account of this undesirable signal spillover into an adjacent power supply system.

SUMMARY OF THE INVENTION

Accordingly, a primary object of the present invention is to provide an improved method for remote control through a power supply system, and an improved arrangement or apparatus for carrying out this method, in which the interference effect referred to above, known among experts as "spillover" or "influencing", namely the undesirable response of receivers to interference signals of the same frequency spilling over from an adjacent power supply system into the power supply system incorporating the receivers, does not occur.

The present invention particularly relates to a method for remote control through a power supply system, which is distinguished by the fact that, at the transmitting end, the control commands are superimposed in the form of angle-modulated signals upon a power line of the power supply system and are removed from the power supply system at any point thereof, being subsequently discriminated and then evaluated according to their momentary frequency or phase.

The invention also further relates to an arrangement or apparatus for carrying out this method, which is characterized by the features that a transmitter which can be modulated in its frequency or phase with the information corresponding to the control commands is provided at the transmitting side or end, being coupled through coupling means at the transmitting end to a power line of the power supply system provided for transmission, and further that at least one receiver is connected to at least one arbitrary point of the power supply system, incorporating selection means for the signals to be received, a frequency or pahse discriminator following said selection means and an evaluation stage following the discriminator.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 7 is a table showing parameters of the modulator;

FIG. 12 is a truth table;

DETAILED DESCRIPTION OF THE PREFERRED EMBODIMENTS

Figure 1:
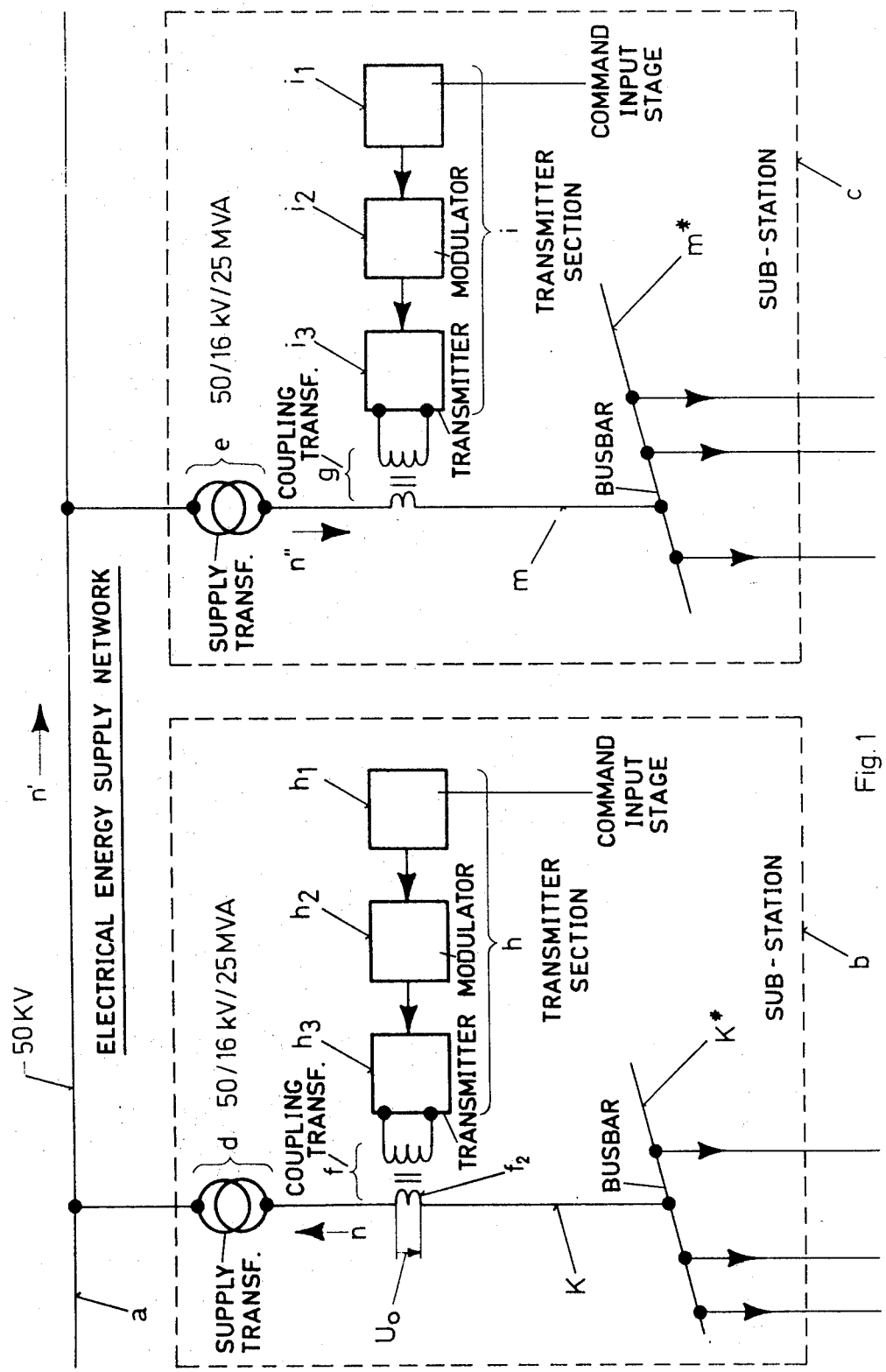
FIG. 1 shows a simplified basic circuit diagram of an electrical energy-supply network.

In all the Figures, identical components have been provided with the same reference numerals.

Before any embodiments of the invention are described, the problem on which the invention is based will first be discussed in detail with reference to FIG. 1. FIG. 1 shows a simplified basic circuit diagram of an electrical energy-supply network. In the interests of simplicity, the network illustrated in this circuit diagram is single-phase in structure. However, networks of this kind are normally designed as three-phase networks, although this is of no significance so far as the following explanation is concerned.

A high-voltage line $a$, for example carrying 50 KV, feeds two substations $b$ and $c$. Each of these substations $b$ and $c$ houses a feed or supply transformer $d$, $e$ which transforms the voltage of 50 KV to a voltage of, for example, 15 KV. A feed transformer of this kind has an output of, for example, 25 MVA. On its primary side, the feed transformer $d$, $e$ is connected to the 50 KV high-voltage line $a$. Its secondary side is connected through a coupling transformer $f$, $g$, arranged in a power line $k$, $m$, to the busbar $k$, $m$ of the respective substations $b$, $c$. The medium-voltage power lines, associated with the particular substation $b$, $c$, of the corresponding power supply system are connected to this busbar $k$, $m$. The control signals representing the control commands, which emanate from a transmitter $h$, are coupled in to the power supply system supplied by the substation $b$ through the coupling transformer $f$. The transmitter section $h$ consists essentially of a command-input stage $h_1$, a modulator $h_2$ controlled by this input stage and a transmitter $h_3$ influenced by the modulator $h_2$. Similarly, a transmitter section $i$ is connected to the coupling transformer $g$ of the substation $c$. The transmitter section $i$ also consists of a command-input stage $i_i$, a modulator $i_2$ and a transmitter $i_3$.

For various reasons, and especially for reasons of frequency economy, the same transmitting frequencies are normally used in adjacent substations. The voltage $U_0$ generated on the secondary side $f_2$ by the transmitter section $h$ is added to the mains voltage supplied by the secondary side of the feed transformer $d$. Under the effect of the voltage $U_0$, a signal-frequency current also flows through the feed transformer $d$ to the higher-order high-voltage network, i.e. to the high-voltage line $a$. This is indicated by an arrow $n$. Part of this current, indicated in FIG. 1 by an arrow $n'$, flows through the high-voltage line $a$ and, finally, enters the power supply system of the substation $c$ through the feed transformer $e$, as indicated in FIG. 1 by an arrow $n''$. In this way, a remote-control-frequency interference voltage appears in the power supply system connected to the substation $c$. This interference voltage may cause receivers connected to the power supply system of the substation $c$ to respond falsely to control commands emanating from the substation $b$. Naturally, the same also applies as regards control commands emanating from the substation $c$ which can penetrate into the power supply system of the substation $b$ through the feed transformer $e$, the high-voltage line $a$ and the feed transformer $d$. Practical experience has shown that the damping of interference signals transmitted in this way only amounts to some 10 db for frequencies below about 300 c/s. In view of the tolerances, always present in practice, of the response level of the various receivers on the one hand, and the fluctuations in level of the remote control signals that are possible in any power supply system for example due to excessive voltage increases, on the other hand, it will readily be appreciated that, in view of the described interference, receivers can respond falsely to control commands from an adjacent power supply system. As already mentioned, the provision of blocking means in the high-voltage line $a$ is undesirable for various reasons, with a result that, in the past, the interference effect known as "spillover" has had to be accepted.

Conventional remote control systems, especially ripple-control systems, using a power line or a power supply system as the transmission channel, operate with audiofrequency control signals, the A1-modulation principle being applied. Accordingly, the output signal from the remote control transmitter is keyed in its amplitude in rhythm with the impulse sequences to be transmitted. The information is represented by the two binary values 1 and 0, the information being codable in basically any way.

In view of the noise level both of the power supply system and of the receiver, and especially in view of the possible fluctuations in the noise level, it is necessary, in cases where A1-modulation is applied, to use such a high signal level that, even in the most unfavorable case, the binary value 1 still can be distinguished sufficiently reliably from the binary value 0. A response threshold is associated with the receiver in such a way that all signals below this threshold are evaluated as binary 0 and all signals above this threshold as binary 1. In other words, the signal received is amplitude-evaluated. Although a general increase in the transmitting level provides for an improvement in the signal-to-noise ratio of the power supply system, it is totally ineffectual in regard to spillover because the corresponding increase in transmitting level at the adjacent substation is accompanied by a corresponding increase in the spillover voltage, with the result that spillover is, of course, not reduced.

According to the invention, the principle of angle modulation is applied for signal transmission through a power line or a power supply system. Angle modulation includes both frequency and phase modulation. It is a well known fact that these two forms of modulation are related to one another. The exemplary embodiments described in the following relate to frequency modulation. Any differences by comparison with phase modulation can be assumed to be known to those skilled in the art.

In the past, the application of frequency modulation to remote control through power supply systems has been regarded as unrealistic, for example because no practicable system was conceivable in view of the frequency bands available, taking into account the interference spectra, especially the mains frequency harmonics. However, more precise investigations have now shown that, providing certain conditions are observed, a remote control system based on angle modulation, especially frequency modulation, is entirely practicable and actually affords distinct advantages over conventional A1-modulation systems. One major advantage is, in particular, the fact that the problem of spillover referred to above can be satisfactorily solved in this way. Providing the transmitter section and, in particular, the receiver section are suitably designed, a frequency-modulated remote control system is almost completely immune to interferences with the same frequency of the kind referred to above by virtue of the fact that differences in level of only about 1 ... 2 db are sufficient to suppress a spurious signal with the same frequency. Further advantages will become apparent from the following description of illustrative embodiments.

Figure 2:
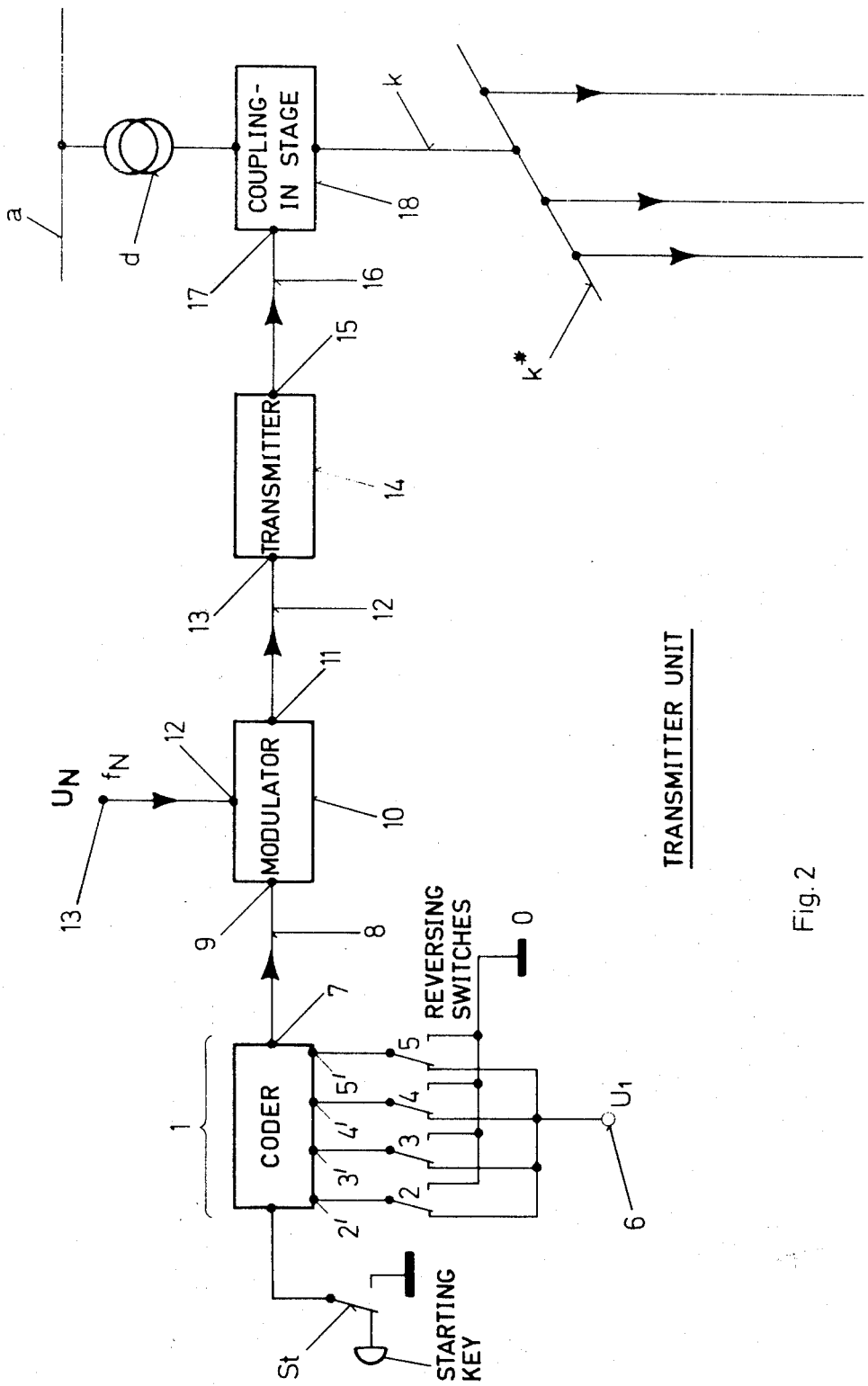
FIG. 2 is a block circuit diagram of a transmitter.

A transmitter unit or device for a frequency-modulated remote-control system of the kind referred to above will first of all be described in the following. FIG. 2 is a block circuit diagram of this transmitter unit. It consists of a coder 1 which forms the pulse telegram or message required for transmission. In the present embodiment, the coder 1 is designed to form a pulse telegram which consists of a starting bit and four following bits of information. Accordingly, the coder 1 comprises a starting key St and four reversing switches 2, 3, 4 and 5 by means of which either the zero potential or a positive voltage $U_1$, which is present at a terminal 6, can be delivered to the associated terminals 2', 3', 4' and 5' of the coder, depending upon the setting of the aforementioned reversing switches 2 to 5. The coder will be described in detail hereinafter with reference to FIGS. 3, 4 and 5.

There are several ways in which an impulse or pulse telegram can be formed according to the switch positions of the coder 1. There are numerous publications on this theme in the literature. It is merely pointed out that it is of considerable advantage to use codes which have a redundance. This redundance can be used for automatic error correction. In this connection, reference is made to the article by R. W. Hamming entitled "Error Detecting and Correcting Codes" Bell Syst. Techn. Journal, April, 1950, pages 147 ... 160, and to the book by W. W. Peterson entitled "Prufbare und Korrigierbare Codes", Verlag Oldenbourg, 1967. Another possible method of forming definitive impulse patterns is described for example in German patent publication 2,226,339.

Following operation of the starting key St, the coder 1 delivers at its output 7 an impulse or pulse telegram beginning with a starting bit in which the position of the pulses and pulse gaps are determined by the position of the reversing switches 2 ... 5.

The impulse telegram thus formed is delivered from the output 7 of the coder 1 through a line 8 to a control input 9 of a modulator 10. The structure and mode of operation of the modulator 10 will be described hereinafter with reference to FIGS. 6 to 12. However, it is merely pointed out at this stage that the modulator 10 delivers a frequency-shift-keyed impulse or pulse telegram at its output 11. The frequency-shift-keyed impulse telegram at the output 11 of the modulator 10 has the same clock frequency as the impulse telegram at the output 7 of the coder 1. The modulator 10 associates a frequency $f_1$ or $f_2$ with the impulse telegram delivered to it at its control input 9, depending on whether the impulse telegram shows the logical value 1 or 0 at its input 9.

The frequencies $f_1$ and $f_2$ are preferably each brought into a certain, fixed relationship to the mains frequency $f_N$ of the power supply system, as will be explained in more detail hereinafter. To this end, a reference signal $U_N$ with the mains frequency $f_N$, carried at a terminal 13, is delivered to another input 12 of the modulator 10.

The choice of the two frequencies $f_1$ and $f_2$ should be made on the one hand with sensible frequency planning in mind and, on the other hand, with aspects relating to communications systems in mind. In order, on the one hand, to provide for a large number of communications channels, as low a frequency shift as possible is desirable to enable the band width of the system to be kept as narrow as possible. On the other hand, a high frequency shift would be desirable, again for reasons of systems engineering, to achieve as high a modulation index as possible. Reasons for a high frequency shift include, for example, on the one hand the less stringent demands upon frequency precision in the transmitting and receiving section, and on the other hand the lower interference in the form of so-called frequency jitters, i.e. sporadic jumps in frequency of the kind which can occur, in the case of the frequencies $f_1$ and $f_2$, through technical imperfections or incompleteness of the corresponding apparatus. With a high frequency shift, however, the necessary channel width may be too large for practical requirements, because it must be remembered that remote control systems which work through the power supply system preferably operate in the frequency range between two adjacent mains frequency harmonics.

According to recently acquired knowledge (cf. NTZ 1972 No. 11, pages 497 ... 502, Fehlerwahrscheinlichkeit binarer Frequenzmodulation, F. Leitzl), favorable results can even be obtained with a very low modulation index, preferably less than 1, the band width of the system being as narrow as the Nyquist band width. Due to the narrow band width, interference reception is also limited with the result that high safety in transmission and low probability of error are achieved in spite of a low modulation index.

The following system parameters were used for the present embodiment:

Table I

| | | |
|---|---|---|
| Mains frequency | $f_N$ | = 50 c/s (Hz) |
| Transmitting frequency for bit "log O" | $f_1$ | = 124.333 c/s |
| Transmitting frequency for bit "log 1" | $f_2$ | = 125.667 c/s |
| Bit duration | $T_1$ | = 0.6 second |
| Modulation frequency (maximum) | | = 0.833 c/s |
| Stepping rate | | = 1.6 baud |
| Modulation index | $m$ | = 0.8 |
| System band-width | B | = 1.6 c/s | the frequencies $f_1$ and $f_2$ being kept in a fixed relationship to the mains frequency $f_N$. It would of course also be possible to derive the frequencies $f_1$ and $f_2$ from a constant-frequency oscillator, for example a quartz oscillator. However, in view of possible fluctuations in the mains frequency $f_N$ and, hence, in the associated scan or pattern of harmonics of the mains frequency, it has proved to be of greater advantage to generate the transmitting frequencies $f_1$ and $f_2$ in a fixed relationship to the mains frequency. By binding the transmitting frequencies to the mains frequency in this way, the transmitting frequencies always lie relatively equally between the harmonics of the mains frequency, even in the event of fluctuations in the mains frequency.

The modulator 10 delivers the frequency-shift-keyed impulse telegram produced by it from its output 11 through a line 12 to a control input 13 of a transmitter 14, for example in the form of an amplifier of adequate output or a static inverter controlled by the frequency-shift-keyed impulse telegram. The block circuit diagram of FIG. 2 is only shown for one phase. A three-phase control signal of course can be obtained in known manner from the impulse telegram of the coder 1 or modulator 10.

The considerable increase in safety of transmission obtained by virtue of the system parameters selected, cf. Table I above, in relation to conventional A1-modulated remote-control systems operating through power supply networks, and in particular the high degree of immunity to spillover, make it possible to work with a voltage level some 20 to 30 db lower by comparison with conventional remote control systems operating through power supply networks. This is another advantage of the novel system accordint to the invention. Whereas with a 25 MW power supply system, for example, it has hitherto been necessary to provide a signal output of about 25 to 50 kW, it is sufficient in the system according to the invention to provide a much lower output of, for example, a few hundred watts in cases where a high-efficiency coupling-in stage is used, and of about 1 to 2 kW in cases where a coupling-in stage with a relatively low degree of efficiency is used.

The transmitter 14 can be in the form of, for example, a static inverter of known type (cf. for example Swiss Patent 486,141 the disclosure of which is incorporated herein by reference). The transmitting power generated by the transmitter 14 is delivered from its output 15 through a line 16 to an input 17 of a coupling-in stage 18 which will be described in more detail hereinafter with reference to FIG. 13. The coupling-in stage 18 is connected on the one hand to the transmitter 14 and, on the other hand, is connected into the line $k$ which leads from the secondary side of the feed transformer $d$ to the busbar $k$ of the substation $b$, cf. also FIG. 1.

Figure 3:
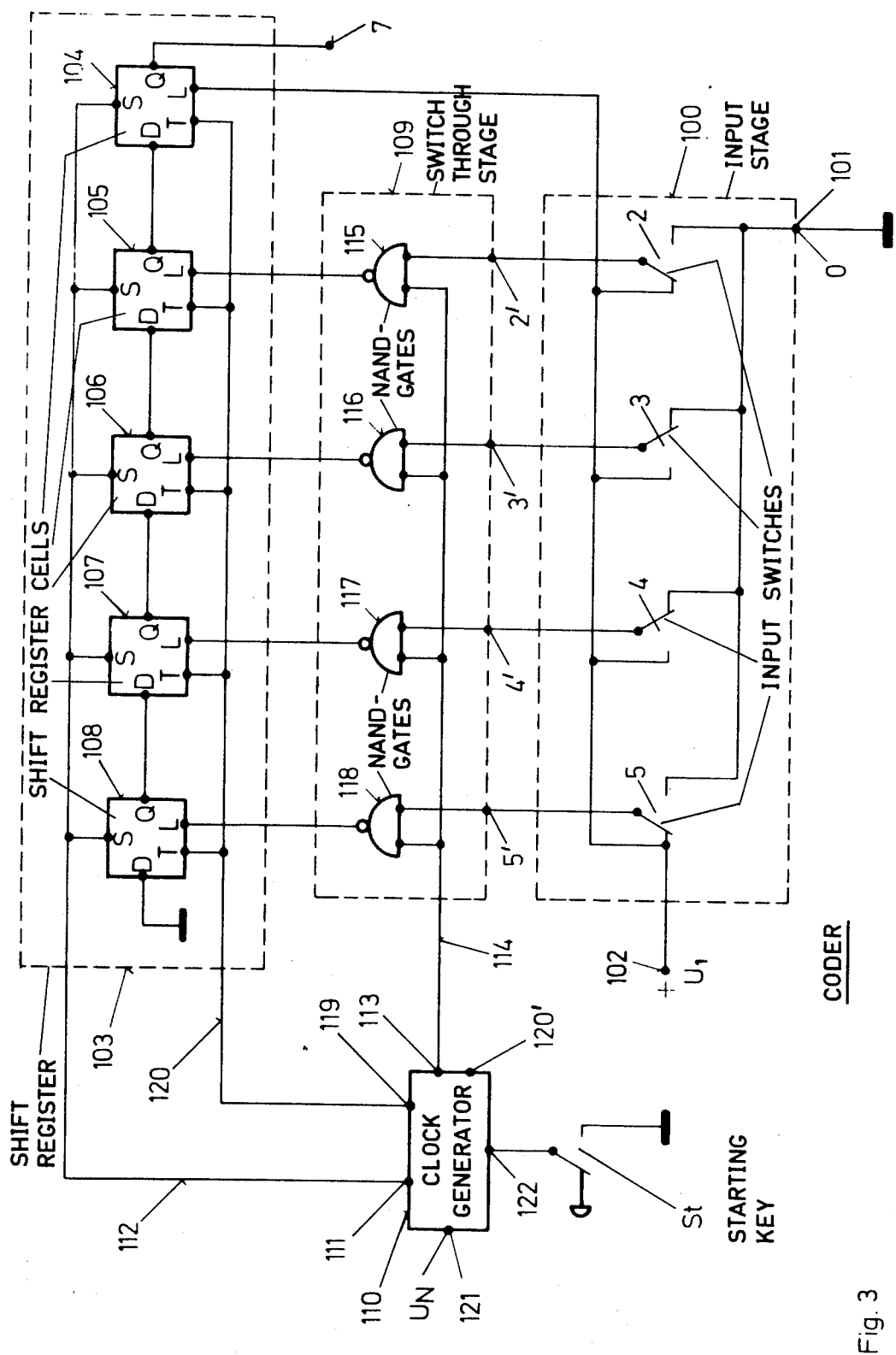
FIG. 3 is a circuit diagram of a coder.
Figure 4:
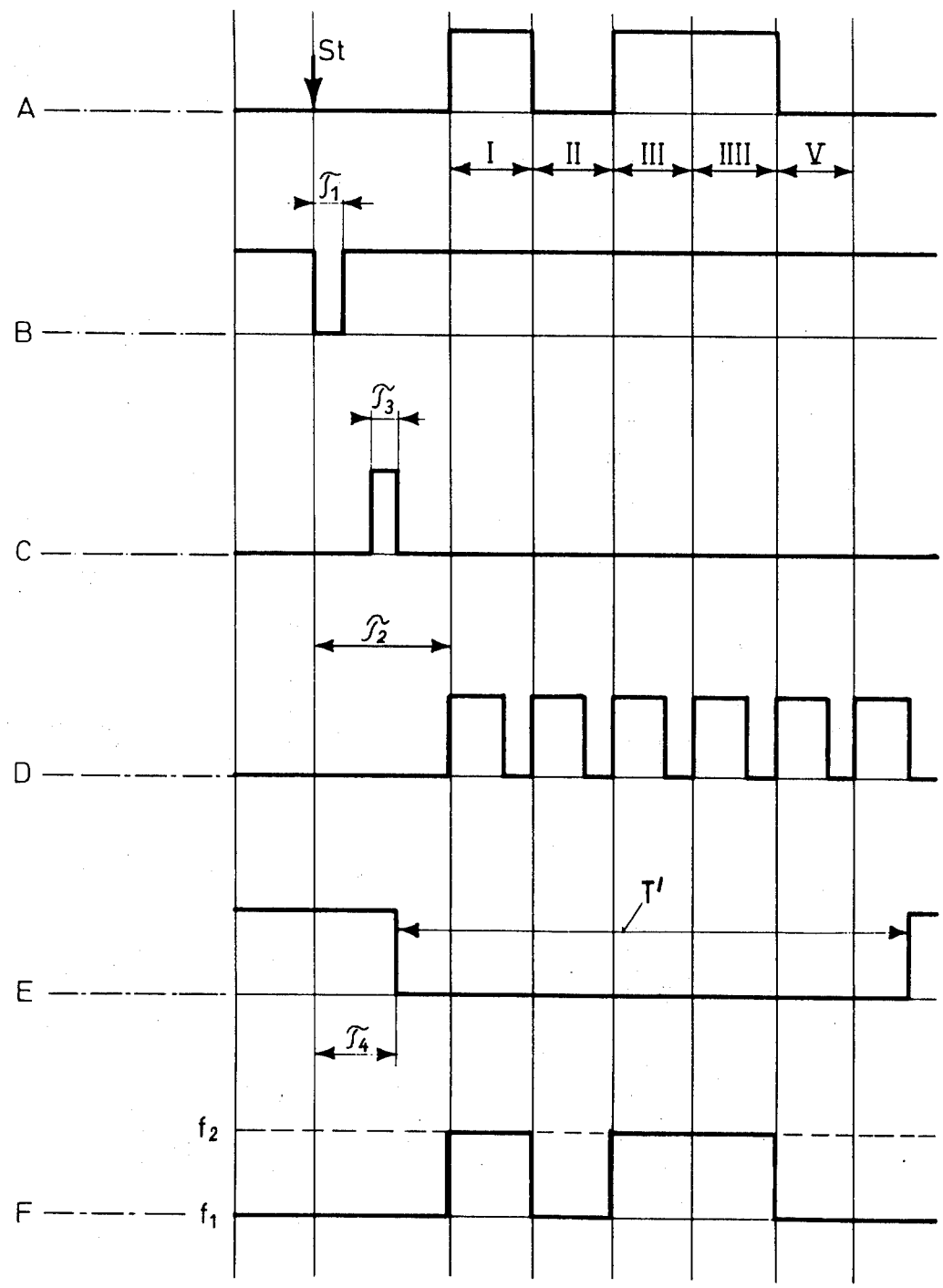
FIG. 4 illustrates impulse diagrams.

FIG. 3 shows a circuit diagram of one embodiment of a coder 1 (cf. also FIG. 2). In the present embodiment, it is assumed that an impulse telegram with a total of 5 intervals is to be formed. The first interval I is to accommodate a starting impulse, the second interval II an impulse gap, the IIIrd. and IVth. intervals one impulse each and the Vth. interval another impulse gap. An impulse telegram of this kind is shown in FIG. 4, line A. In order to form an impulse telegram of this kind according to FIG. 4, line A, the coder 1 has the following structure illustrated in FIG. 3.

An input stage 100 comprises input switches 2, 3, 4 and 5 which are associated with the intervals II to V and whose contact fingers can be applied either to the zero potential of a terminal 101 or to a positive auxiliary voltage $U_1$ at a terminal 102.

In addition, the coder 1 incorporates a shift register 103 with as many shift-register cells or stages as there are intervals in the impulse telegram to be formed. In the present embodiment, the shift register 103 comprises the shift register cells 104, 105, 106, 107 and 108.

A switch-through stage 109 is arranged between the input stage 100 and the shift register 103. Both the shift register 103 and the switch-through stage 109 are supplied with clock impulses or control signals from a clock generator 110.

In addition, a starting key St is provided for initiating the formation of an impulse telegram. The clock generator 110 can be brought into operation by means of this starting key.

The shift register 103 can be made up, for example, of integrated circuts of type SN7474 N manufactured by Texas Instruments, USA. These integrated circuits act as flip-flops. The shift register cells 104 . . . 108 or their flip-flops are connected in a cascade circuit arrangement insofar as the D-input of each flip-flop is connected to the Q-output of the adjacent flip-flop. The zero potential is delivered to the D-input of the flip-flop of the last shift register cell or stage 108. The Q-output of the flip-flop of the first register cell or stage 104 is connected to the output terminal 7 of the coder 1.

The clock generator 110, which will be described in more detail hereinafter with reference to FIG. 5, delivers at its output 111 an impulse-like or pulse-like control signal whose trend or course as a function of time is illustrated in FIG. 4, line B. This control signal (cf. FIG. 4, line B) is delivered through a line 112 to the setting inputs S of the flip-flops, the five shift-register cells or stages 104 . . . 108, with the result that the flip-flops are all brought into the same state and carry the logical signal 1 at their Q-outputs. Another output 113 of the clock generator 110 delivers to a line 114 a control signal whose course as a function of time is illustrated in FIG. 4, line C. The line 114 leads to a first input of NAND-gates 115 . . . 118 associated with each input switch 2 . . . 5, another input being conductively connected through terminals 2' . . . 5' with the contact finger of the associated input switch 2 . . . 5 of the input stage 100. By means of this control signal (cf. FIG. 4, line C), the information expressed by the particular position of the input switches 2 . . . 5 is delivered through the switch-through stage 109 to the shift register 103 following operation of the starting key St and at the end of a time interval $\tau_1$. It should be noted that the switch-through stage 109 only switches through during the brief pulse duration of the signal according to FIG. 4, line C, and, in this way, delivers the potential present at the contact finger of each of the input switches 2 . . . 5 through the NAND-gates 115 . . . 118 of the switch-through stage 109 in inverted form to the clearing inputs L of the flip-flops in the shift-register cells 105 . . . 108. For the rest of the time, the input stage 100 is separated from the shift register 103. The clearing input L of the flip-flop of the first shift-register cell 104 is continuously connected with the positive voltage $U_1$ of the terminal 102 to ensure that a pulse acting as the starting pulse is always formed in the first interval of each impulse or pulse telegram.

At another output 119 the clock generator 110 delivers a sequence of clock impulses through a line 120 to the clock inputs T of the flip-flops in the shift-register cells or stages 104 . . . 108 of the shift register 103. The course of this clock-impulse sequence at the output 119 of the clock generator 110 as a function of time is shown in FIG. 4, line D. This clock-impulse or clock pulse sequence preferably begins after a time interval $\tau_2$ following operation of the starting key St, $\tau_2 > \tau_1$.

The clock generator 110 is preferably designated in such a way that it delivers at another output 120' a control signal whose course as a function of time is illustrated in FIG. 4, line E. This signal according to FIG. 4, line E, marks the entire duration of an impulse telegram, with a result that this signal also can be used to bring a transmitter designed to transmit the impulse telegram temporarily into operation.

In order to coordinate the impulses or control signals of the clock generator 110 as a function of time and to bring them into a fixed relationship to the mains frequency, a mains-frequency signal $U_N$ is applied to an input 121 of the clock generator 110.

Figure 5:
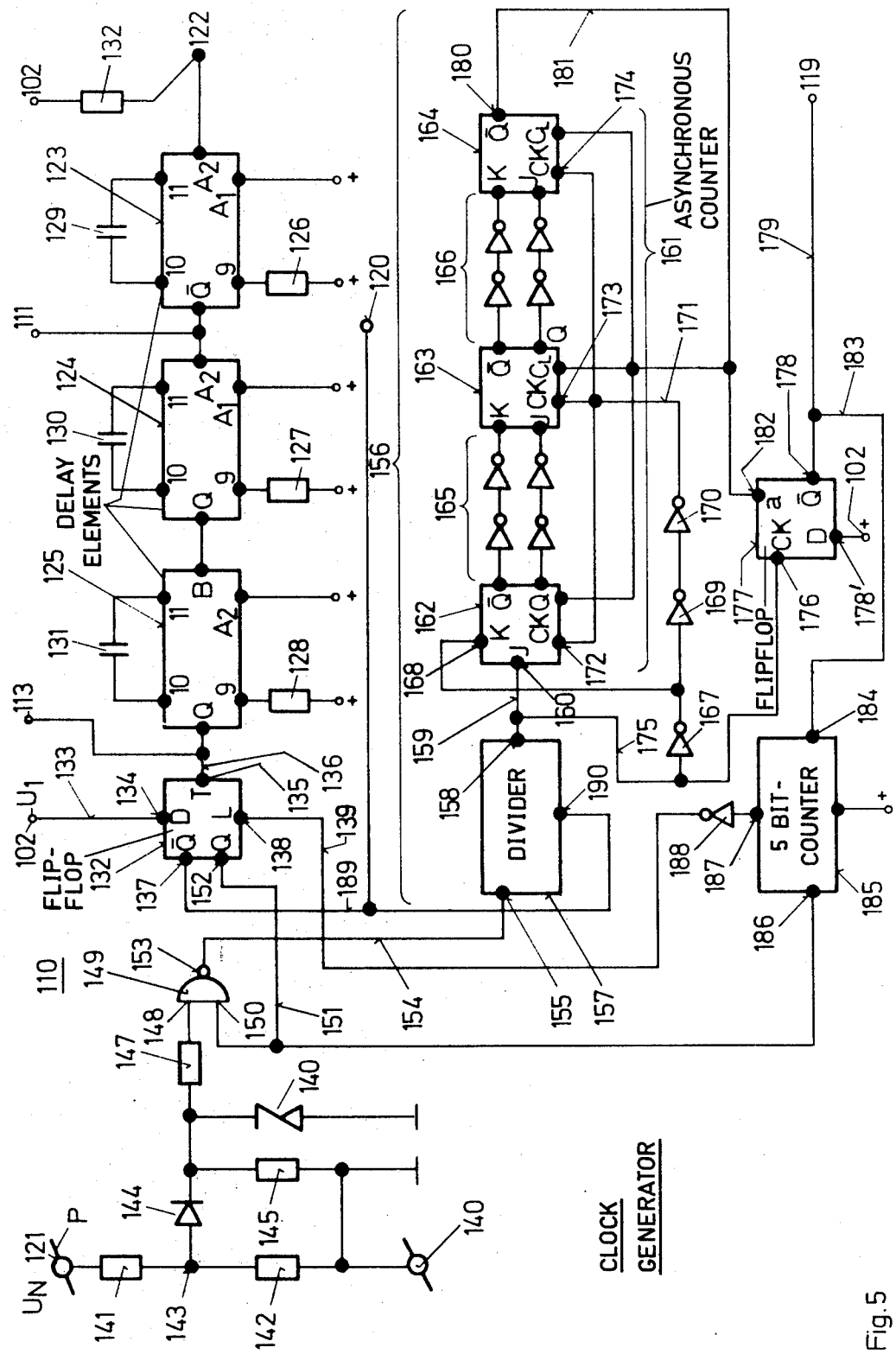
FIG. 5 is a circuit diagram of a clock generator.

FIG. 5 shows a circuit diagram of one embodiment of a clock generator 110 (cf. also FIG. 3). Three delay elements 123, 124 and 125 connected in cascade or tandem are connected to the terminal 122 to which the starting key St is also connected. By means of the resistors 126, 127 and 128 and the capacitors 129, 130 and 131, respectively, associated with these delay elements, the delay times of the delay elements 123, 124 and 125 can be adjusted to the required values. The delay time of the delay element 129 is $\tau_1$, the delay time of the delay element 124 $\tau_2 - \tau_1$ and the delay time of the delay element 125 $\tau_3$ (cf. FIG. 3). The delay elements 123 . . . 125 delay the starting command $\tau_4$ transmitted by operation of the starting key St. In the present embodiment, the delay elements 123 . . . 125 are in the form of type SN 74121 N monoflops manufactured by Texas Instruments, USA. In FIG. 5, the characterizing codes of the aforementioned hardware manufactured by Texas Instruments are shown in the blocks representing these monoflops. A positive auxiliary voltage is delivered from the terminal 102 to the terminal 122 through a resistor 132. When the starting key St is operated, the terminal 122 is grounded so that a negative flank is formed at the terminal 122, starting the monoflop of the delay element 123. A signal corresponding to line C in FIG. 3 then appears at its output Q and the terminal 111. This signal also starts the monoflop of the following delay element 124, with the result that a signal according to line D in FIG. 4 is formed at its output Q. The signal appearing at the output Q of the delay element 124 starts the monoflop on the next delay element 125.

The output voltage of the third delay element 125 is carried to the terminal 113 (cf. FIG. 3). However, the impulse appearing at the output Q of the delay element 125 also starts a clock-impulse preparation cycle for producing the other clock impulses or control signals required in the coder 1 (cf. FIG. 4).

The clock generator 110 comprises a flip-flop 132, for example in the form of a so-called D-flip-flop, for example of the SN7474 N type manufactured by Texas Instruments. The positive voltage $U_1$ is delivered as logical signal 1 to the data input 134 of the flip-flop 132 from the terminal 102 through a line 133. A clock input 135 of the flip-flop 132 is connected to the Q-output of the last delay element 125 through a line 136, through which the signal appearing at the Q-output of the delay element 125 (cf. FIG. 4, line C) is delivered to the flip-flop 132. The flip-flop 132 is triggered on the arrival of the starting command delayed by $\tau_4$. This means that its output 137 carrying the inverse output signal goes to the logic state 0. The flip-flop 132 remains in this position until a clearing pulse is delivered to its clearing input 138 through a line 139.

A voltage divider consisting of the resistors 141 and 142 is connected to the input terminals 140 and 121 of the clock generator 110 which are connected to the neutral conductor O or the phase conductor P of a power supply system of, for example, 220 V, 50 c/s. By means of this voltage divider, the mains voltage $U_N$ with the frequency $f_N$ is reduced to a value compatible with the electronic components of the clock generator 110.

Through a diode 144, the a.c. voltage appearing at the voltage dividing point 143 produces positive pulses across a resistor 145 with which a Zener diode 146 is connected in parallel. These positive pulses are delivered through a resistor 147 to an input 148 of a NAND-gate 149 combined with a Schmitt trigger. The NAND-gate 149 can be in the form of, for example, a type SN7413N NAND-gate manufactured by Texas Instruments, which itself incorporates the aforementioned Schmitt trigger.

A second input 150 of the NAND-gate 149 is connected through a line 151 to the non-inverting output 152 of the flip-flop 132. By virtue of this connection with the flip-flop 132, the NAND-gate 149 only allows mains-frequency pulses to pass from its output 153 through a line 154 to an input of a counting stage 156 for the duration T' (cf. FIG. 4, line E) of an impulse or pulse telegram.

The counting stage 156 is used to produce the aforementioned bit-duration or clock time of, in the exemplary embodiment under discussion, 0.6 seconds from the mains-frequency impulses or pulses delivered to it. These mains-frequency pulses follow one another at a frequency of 0.02 seconds for a 50 c/s mains voltage. In addition, the beginning of the first clock impulse has to be delayed, as already mentioned, in this example by 0.2 seconds (cf. FIG. 4, line D).

Ten impulses or falling pulse flanks coming from the NAND-gate 149 are initially counted off in a divider 157, for example of the SN7490 type manufactured by Texas Instruments. The tenth impulse or the tenth falling pulse flank appears at an output 158 of the divider 157. This tenth pulse is delivered through a line 159 to an input 160 of a three-stage asynchronous counter 161. The asynchronous counter 161 can be composed, for example, of three flip-flops 162, 163 and 164 of the SN7474N type manufactured by Texas Instruments. The flip-flops 162, 163 and 164 are coupled through delay elements represented by inverter groups 165 and 166. The code normally used for designating the connections of components of this type is indicated in the blocks representing this asynchronous counter 161 in FIG. 5. This accounts for the necessary circuit arrangement of the structure of the asynchronous counter 161. The signal delivered to the input 160 is also delivered through an inerter 167 to the K-input 168 of the first flip-flop 162 of the asynchronous counter 161. After they have been inverted and delayed in two series-connected inverters 169 and 170, the pulses at the output 158 of the first divider 157 form the shift clocks for the asynchronous counter 161. These shift clocks are delivered through a line 171 to the clock inputs 172, 173 and 174 of the flip-flops 162, 163 and 164.

The pulse appearing at the output 158 of the divider 157, after the first twenty input pulses of the divider, is delivered through a line 175 to a clock input 176 of a D-flip-flop 177, for example of the SN7474N type manufactured by Texas Instruments. The positive voltage $U_1$ is permanently delivered as logical signal 1 from the terminal 102 to the data input 178' of the D-flip-flop 177. The flip-flop 177 is triggered by the twentieth impulse and, at its output 178 carrying its inverted output signal, delivers a first shift clock which is delivered through a line 179 to the output terminal 119 of the clock generator 110. A clearing signal is then delivered from the inverted output 180 of the flip-flop 164 through a line 181 to the clearing input 182 of the D-flip-flop 177, so that the D-flip-flop 177 is reset by the output signal of the asynchronous counter 161.

Thereafter, a shift pulse appears at the output terminal 119 at 0.6 second intervals.

The shift pulses at the terminal 119 are also delivered through a line 183 to a clock input 184 of a 5-bit counter 185, for example of the SN7496N type manufactured by Texas Instruments. A clearing input 186 of the 5-bit counter 185 is connected to the line 151. In this way, the 5-bit counter 185 is initially cleared at the beginning of an impulse or pulse telegram. After five shift clocks have been delivered, it delivers a logical signal 1 at its output 187. This logic or logical signal 1 is inverted in an inverter 188, so that a logic signal 0 is delivered as clearing signal to the D-flip-flop 132 through the line 139. In this way, the D-flip-flop 132 is reset after the five shift clocks at the terminal 119, and a positive pulse appears at the output 137, being delivered through a line 189 to the output terminal 120 of the clock generator 110. In addition, this pulse is delivered to the clearing input 190 of the first divider 157. A pulse sequence according to FIG. 4, line E, appears at the output terminal 120, and the divider 157 is returned to its starting position at the beginning of each interval.

The structure and mode of operation of a modulator 10 (cf. also FIG. 2 and the Table) will now be explained with reference to FIGS. 6 and 7. The pulse sequence according to FIG. 4, line A, consisting of pulses and pulse gaps, is delivered from the output 7 of the coder 1 through the line 8 to the control input 9 of the modulator 10. The function of the modulator 10 is now to deliver, at its output 11, a signal with the frequency $f_1$, in the discussed example 124.333 c/s, when a pulse gap, i.e. a bit with the logical value 0, appears in the aforementioned pulse sequence, but, by contrast, to deliver a signal with the frequency $f_2$, in this example 125.666 c/s, when a pulse, i.e. a bit with the logical value 1, appears in the aforementioned pulse sequence. These associations are shown in FIG. 4, lines A and F.

The seemingly obvious solution, namely to provide a separate oscillator for each of the frequencies $f_1$ and $f_2$ and to connect these oscillators alternately to the output 11 of the modulator 10 through a keying device, in accordance with the pulse or impulse sequence at the input 9 of the modulator 10, is not compatible with the particular problem at hand. The direct frequency-shifting of an oscillator, for example by variation of capacitance or inductance, is also unsuitable.

At the receiving side or end, a transmission system of the kind described earlier on, especially a transmission system operating with a system band width determined by Nyquist's band width, necessitates the use of relatively narrow-banded selection means if inherent advantages are to be obtained in such a system. The reason for this is that, in the case of frequency-shifting between two oscillators of different frequency, or in the case of direct frequency-shifting by influencing the inductivity or capacitance of a frequency-determining tank circuit of the oscillator, extremely troublesome transients both in regard to amplitude and in regard to frequency occur in the narrow-band filters required at the receiving end. These transients would seriously affect the quality of transmission and, in particular, would lead to an increased probability of error in the transmission of binary frequency-modulated signals.

In view of possible frequency variations in the mains frequency $f_N$ of the power supply system used for transmission, it has also proved to be of advantage to keep the transmitting frequencies $f_1$ and $f_2$ in a fixed relationship to the mains frequency $f_N$, because, in this way, these frequencies retain their relative position within the frequency field determined by the mains frequency $f_N$ and its harmonics, even in the event of changes in the mains frequency.

According to the invention, the two frequencies $f_1$ and $f_2$ are always kept in a fixed relationship to the mains frequency $f_N$. These two frequencies $f_1$ and $f_2$ are generated by means of an arrangement of the kind illustrated in FIG. 6.

The modulator 10 consists essentially of two parts, namely a reference frequency generator 10A and a frequency-shift keying unit 10B. The reference frequency generator 10A produces a first reference frequency $f_{R1}$, in the exemplary example 5000 c/s, rigidly related to the mains frequency $f_N$ at an output terminal 201 of the reference frequency generator 10A from the signal $U_N$ delivered to the terminal 12 of the modulator 10 (cf. also FIG. 2) with the frequency $f_N$.

The mains voltage $U_N$ at the terminal 12 is divided through a voltage divider consisting of the resistors 202 and 203 in such a way that a value compatible with the electronic components of the modulator 10 appears at the voltage dividing point 204. The mains-frequency voltage at the voltage-dividing point 204 is delivered through a diode 205 to a resistor 206 and the Zener diode 207 connected in parallel with it in order to obtain a 50 c/s rectangular pulse sequence at the switching point 208. An impulse or pulse forming cycle takes place through a NAND-gate 209 in order to obtain improved flank steepness of the 50 c/s rectangular impulse sequence appearing at the output 210 of the NAND-gate 209.

This 50 c/s rectangular pulse sequence is delivered through a line 211 to a first input 212 of a phse discriminator 213.

A reference oscillator 214 controllable in its frequency by a control voltage $U_{S1}$ produces a first reference frequency $f_{R1}$. Provision is made in the reference frequency generator 10A to ensure that this first reference frequency $f_{R1}$ is always kept in a certain, fixed relationship to the mains frequency $f_N$. In the exemplary example, $f_{R1} = 100 \cdot f_N$. If, therefore, the mains frequency $f_N$ is at its nominal value of 50 c/s, $f_{R1}$ is equal to 5000 c/s.

The frequency of this reference frequency oscillator 214 can be shifted up and down within a certain range through the control voltage $U_{S1}$ at the control input 215 of the reference oscillator 214. One example of a frequency-controllable oscillator 214 of this type will be described hereinafter with reference to FIG. 8A. At its output 216, the reference frequency oscillator 214 delivers a substantially sinusoidal signal $U_{R1}$ with the frequency $f_{R1}$ which is delivered through a line 217 to an input 218 of a Schmitt trigger 219 acting as a pulse shaper. At its output 220, the Schmitt trigger 219 releases a rectangular pulse sequence $U'_{R1}$ with the repetition frequency $f_{R1}$, in our case 5000 c/s. This rectangular pulse sequence is delivered through a line 221 on the one hand to the output 201 of the reference frequency generator 10A and on the other hand to an input 222 of a first frequency divider 223 of known type. In the first frequency divider 223, the frequency $f_{R1}$ is divided by the divisor D. In our case, D = 100.

Accordingly, a rectangular pulse sequence $U_{R2}$ with the frequency $f_{R2}$, which is D times lower than the first reference frequency $f_{R1}$, appears at an output 224 of the first frequency divider 223. In this case, therefore, a second reference frequency $f_{R2}$ of 5000 c/s: 100 = 50 c/s is formed.

The second reference frequency $f_{R2}$ at the output 224 of the frequency divider 223 is delivered through a line 225 to a second input 226 of the phase discriminator 213. At its output 214, the phase discriminator 213, which will be described in greater detail hereinafter with reference to FIGS. 9 and 10, releases an impulseduration-modulated signal $U_P$ whose mean value is substantially proportional to the phase difference between the rectangular pulse sequences delivered to the two inputs 212 and 226 of the phase discriminator 213. This pulse-duration-modulated signal $U_P$ is delivered through a line 228 to one input 229 of a low-pass filter 230. The transmission characteristic of this low-pass filter 230 is selected in such a way that it is essentially only the d.c. voltage component of the pulse or impulse-duration-modulated signal which appears as a control signal $U_{S1}$ at is output 231. This control signal $U_{S1}$ is a measure of the phase deviation between the mains frequency $f_N$ and the second reference frequency $f_{R2}$. The control signal $U_{S1}$ is delivered through a line 232 to the control input 215 of the controllable reference frequency oscillator 214. The course or trend of the control voltage $U_{S1}$ as a function of the aforementioned phase difference, and the frequency dependency of the reference frequency oscillator 214 upon its control voltage $US_1$, are selected in such a way that any occurring phase deviation alters the frequency of the reference frequency oscillator 214 in such a way that the aforementioned phase difference disappears. Regulating arrangements of this kind are known per se, cf. for example INTERNATIONALE ELEKTRONISCHE RUNDSCHAU, Vol. 26, 1972, No. 10, pages 227 – 231, PHASE-LOCKED LOOP, EINE VIELSEITIG EINSETZBARE TECHNIK, D. MALLON.

The arrangement described above for the reference frequency generator 10A has the following advantages:

1. The first reference frequency $f_{R1}$ is strictly related to the mains frequency $f_N$ and, as a result, affords the possibility of similarly relating the transmitting frequencies $f_1$ and $f_2$ to the mains frequency $f_N$, as will be shown hereinafter.

2. Although the first reference frequency $f_{R1}$, in our example 5000 c/s (for a nominal 50 c/s mains frequency), related in this way to the mains frequency follows the mains frequency $f_N$, it is unaffected by brief fluctuations in the mains frequency or its momentary phase position by virtue of the time constants of the regulating process, especially of the low-pass filter 230. If the first reference frequency $f_{R1}$ were to be produced simply by rigidly multiplying the mains frequency $f_N$, phase jumps or shifts of the mains frequency, of the kind which occur very frequently in a power supply system, would also give rise to jumps in the momentary frequency of any reference frequency produced in this way. Genuine frequency changes of the mains frequency, of the kind which can be caused by changing the rotational speed of the generators, are by nature relatively slow processes and the arrangement shown in FIG. 6 follows them faithfully.

The two transmitting frequencies $f_1$ and $f_2$ to be produced are based on the first reference frequency $f_{R1}$ available at the output 201 of the reference frequency generator 10A.

The function of the frequency-shift keying unit 10B is to produce the frequency $f_1$ when the impulse or pulse telegram delivered to it momentarily possesses the binary value 0, but, in contrast, to produce the frequency $f_2$ when the impulse telegram delivered to it momentarily exhibits the binary value 1. To this end, the control input 9 is connected through a line 233 to a control input 234 of a frequency divider 235 which is reversible or switchable to a divisor $D_{21}$ or $D_{22}$. The reversible frequency divider 235 is part of a phase-regulating circuit 236 which is associated with an oscillator 237 controllable in its frequency by a control signal $U_S$.

An output 238 of the controllable oscillator 237 is connected through a line 239 to the input 240 of a first rigid or fixed frequency divider 241. The first rigid frequency divider 241 has the divisor $D_1$. In our example, $D_1 = 100$. An output 242 of the first rigid frequency divider 241 is connected through a switching junction or point 243 on the one hand to an input 244 of a second rigid divider 245. The second rigid divider 245 has the divisor $D_2$. In our example, $D_2$ equals 600. The output 246 of the second rigid divider 245 is connected through a line 247 to the output terminal 11 of the modulator 10.

The output 238 of the controllable oscillator 237 is connected through a line 248 on the other hand to an input 249 of the reversible frequency divider 235. The reversible frequency divider 235 has the divisor $D_{21}$ or $D_{22}$, depending on whether the binary signal 0 or 1 is delivered to the control input 234. In our example, $D_{21}$ equals 1492 and $D_{22}$ equals 1508.

An output 250 of the reversible frequency divider 235 is connected to a first input 251 of a phase discriminator 252 of the frequency-shift keying unit. A second input 253 of this phase discriminator is connected to the output 201 of the reference frequency generator 10A. An output 254 of the phase discriminator 252 of the frequency-shift keying unit 10B carries a pulse-duration modulated signal $U_P'$, whose direct-current component is governed by the phase difference of the signals delivered to the first and second inputs 251 and 253.

The output 254 of the phase discriminator 252 is connected to the input 255 of a low-pass filter 256 whose output 257 delivers a control signal $U_S'$ corresponding to the afore-mentioned direct-cirrent component through a line 258 to a control input 259 of the controllable oscillator 237. Accordingly, the phase-regulating circuit associated with the controllable oscillator 237 comprises the reversible frequency divider 235, the phase discriminator 252 and the low-pass filter 256.

An embodiment of a reversible frequency divider 235 will be described in the following with reference to FIGS. 11 and 12, whereas an embodiment of a phase discriminator 252 will be described in the following with reference to FIGS. 9 and 10.

It is also pointed out that a low-pass filter with a phase-linear transmission characteristic is preferably used as the low-pass filter 256. Suitable phase filters are known, cf. for example ELECTRONIC ENGINEERING, 1968 May, pages 242 ... 246, and June, pages 326 ... 348, TRANSFER FUNCTIONS APPROXIMATING TO A CONSTANT GROUP DELAY, B. D. Rakovich.

The hard frequency-shift of the reversible frequency divider 235 by means of the steep flanks of the impulse telegram applied to the control input 9, produces a voltage jump in the output signal $U_P'$ of the phase discriminator 252 for each phase jump produced by the frequency shift at the output 254 of the phase discriminator 252 of the frequency-shift keying unit 10B. It is only when this signal is processed in phase-linear form in the low-pass filter 256 that correct frequency shifting of the controllable oscillator 237 is obtained. If overshooting were to occur in the output signal of the low-pass filter 256, these fluctuations in voltage would be delivered in the form of fluctuations in the control signal $U_S'$ to the control input 259 of the controllable-frequency oscillator 237. In this way, frequency fluctuations would arise with each frequency shift, complicating satisfactory evaluation of the transmitting frequencies $f_1$ and $f_2$ derived therefrom. The ripple, emanating from the auxiliary frequency $f_H$, in the control signal $U_S'$ which is delivered to the controllable oscillator 237, must of course be sufficiently small. In the example under discussion, the low-pass filter 256 has a damping of about 50 db at a frequency limit of about 500 c/s for the frequency $f_H$ of 5000 c/s.

The combination of a high-speed frequency-shift keying unit with a reversible frequency divider with a reference frequency generator related to the mains frequency, using separate phase-regulating circuits and coupling the two phase-regulating circuits through a phase discriminator (252), represents an extremely favorable solution to the problem at hand. Frequency-shift keying as rapid as this would be virtually impossible to obtain with an oscillator oscillating directly at the frequency $f_1$ or $f_2$. The intermediate stage of producing a reference frequency $f_{R1}$ of, in this case, 5000 c/s, which itself is confined to the mains frequency $f_N$, also makes it very much easier in practice to establish the requisite filter properties of the low-pass filter 256 than would be the case with direct reference to the mains frequency 50 c/s as the reference frequency.

Table II in FIG. 7 provides a synopsis of the parameters of the modulator 10 and the frequencies occurring therein in accordance with the assumed example as a function of the binary value 0 or 1 of the impulse telegram delivered to the modulator.

Figure 8A:
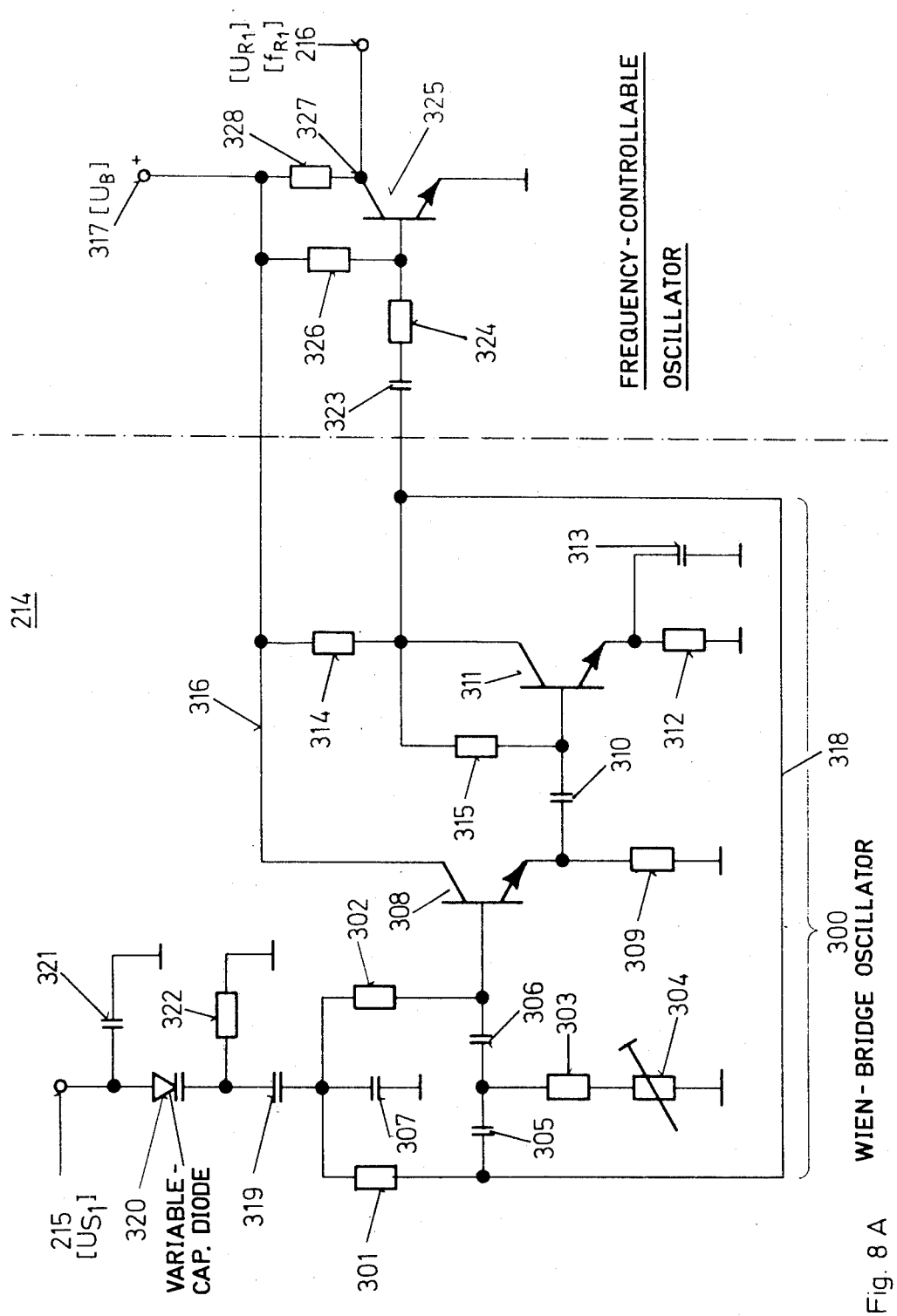
FIG. 8A is a circuit diagram of a frequency-controllable oscillator.

One embodiment of a controllable-frequency oscillator 214 (cf. FIG. 6) of the reference frequency generator 10A will now be described with reference to FIG. 8A. The basis of this embodiment is formed by a Wien-bridge oscillator 300 known per se with the following frequency-determining components: resistors 301, 302, 303 and 304 and capacitors 305, 306, 307. These frequency-determining components are situated in known manner at the input of a two-stage amplifier comprising a first transistor 308 with an associated emitter resistor 309, a coupling capacitor 301, a second transistor 311 with an emitter resistor 312 and an emitter capacitor 313, and a collector resistor 314. The base current is delivered to the transistor 311 through a resistor 315 which is connected from the collector of the transistor 311 to its base. The two-stage amplifier of the Wien-bridge oscillator 300, formed by the two transistors 308 and 311, is fed through a line 316 from a terminal 317 which is at a feed voltage $U_B$. A line 318 represents the feedback path normally encountered in any Wien-bridge oscillator.

In order to make this Wien-bridge oscillator 300 controllable in its frequency, a variable-capacitance diode 320 is connected in parallel a.c.-wise with the frequency-determining capacitor 307 through an isolating capacitor 319. A capacitor 321 connectes one pole of the variable-capacitance diode 320 a.c.-wise to ground. A resistor 322 is used to carry the leakage current of the variable-capacitance diode 320 to ground. The control voltage $US_1$ is delivered to that pole of the variable-capacitance diode 320 which is connected to the control input 215 (cf. also FIG. 6), so that the capacitance of the variable-capacitance diode 320 can be varied. In this way, the frequency of the signal $U_{R1}$ appearing at the output 216 is changed.

Figure 8B:
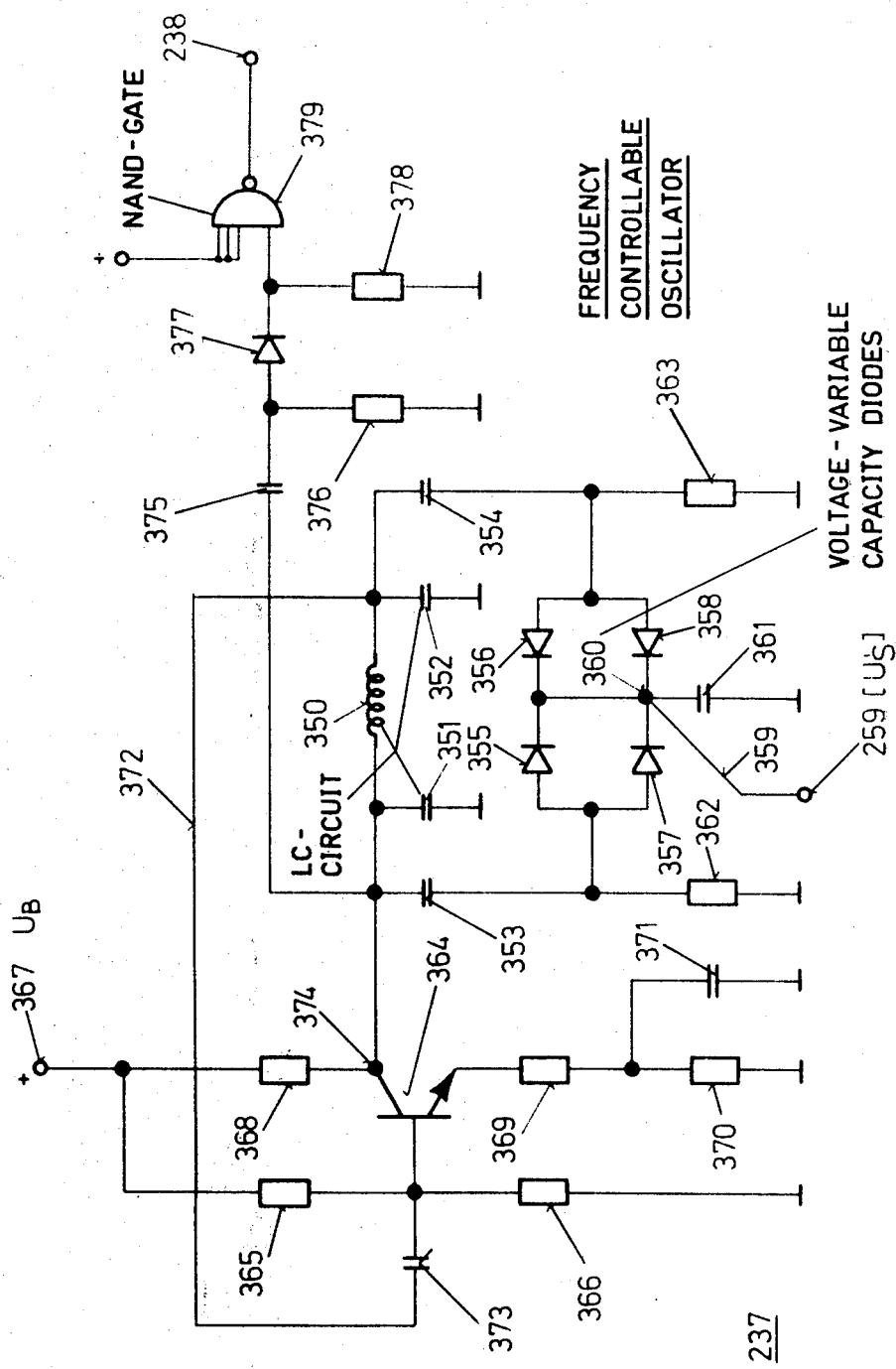
FIG. 8B is another circuit diagram of a frequency-controllable oscillator.

The structure and mode of operation of an embodiment of a controllable oscillator 237 will be described hereinafter with reference to FIG. 8B. Since this oscillator 237 oscillates at a much higher frequency than the reference frequency oscillator 214 already described with reference to FIG. 8A, a Wien-bridge oscillator is less suitable. Accordingly, the circuit diagram in FIG. 8B illustrates oscillator 237 whose frequency-determining element is an LC-oscillator circuit. This LC-oscillator circuit comprises a coil 350, the capacitors 351 and 352 and a group of four voltage-variable diodes 335 . . . 358 connected in parallel with the oscillator circuit through the capacitors 353 and 354. The control voltage $U_S'$ delivered to the controllable oscillator 237 at its control input 259 can be delivered to the aforementioned group of four voltage-variable diodes 355 . . . 358 through the switching point 360, so that their capacitance can be controlled. The switching point 360 is blocked off from ground through a de-coupling capacitor 361 and any leakage current of the voltage-variable diodes 355 . . . 358 is carried to ground through the two resistors 362 and 363. The oscillator circuit of the oscillator 237 is situated a.c.-wise in the collector circuit of a transistor 364, to whose base the necessary base current is delivered through a voltage divider consisting of the resistors 365 and 366 from a terminal 367 lying at a positive supply or feed voltage $U_B$. The collector current is delivered to the transistor 364 from the terminal 367 through a collector resistor 368. A feedback resistor 369 is incorporated in the emitter circuit of the transistor 364 for optimally adjusting the oscillating conditions. In addition, a resistor 370 in the emitter circuit of the transistor 364 is used for establishing an optimum working point, being by-passed a.c.-wise by a capacitor 371. The feedback path of the oscillator leads from the connecting point of the coil 350 and capacitor 352 to the base of the transistor 364 through a line 372 and a capacitor 373. The oscillator voltage appearing at the collector 374 of the transistor 364 is delivered to a resistor 376 through a coupling capacitor 375. The a.c. voltage appearing at the resistor 376 is delivered through a diode 377 to another resistor 378 at which appear the halfwaves, corresponding to the forward direction of the diode 377, with the frequency of the oscillator 237. A rectangular pulse sequence whose frequency is the same as the oscillator frequency is generated at the output terminal 238 by means of a NAND-gate 279 acting as pulse shaper. This frequency is kept at 7.46 or 7.56 mc/s, based on the reference frequency $f_{R1}$, by the phase-regulating circuit 236 (cf. FIG. 6) and the frequency divider incorporated in it. It should be noted that, due to the fact that the first reference frequency $f_{R1}$ is related to the mains frequency $f_N$, and the oscillator frequency of the oscillator 237 to the reference frequency $f_{R1}$, the oscillator frequency of the oscillator 237 is also related to the mains frequency $f_N$. Accordingly, the oscillator 237 always delivers a frequency which amounts to 7.46 or 7.54 mc/s, depending upon the momentary component or divider ratio of the reversible frequency divider 235, when the mains frequency $f_N$ is at its nominal value of 50 c/s, and both of which oscillator frequencies proportionally follow any deviations in the mains frequency $f_N$ with the time constants of the phase-regulating circuits.

The structure and mode of operation of a phase discriminator 213 or 252 (cf. FIG. 6) will now be described with reference to FIGS. 9 and 10. Exactly the same circuit arrangement can be used for both discriminators. (In FIG. 9, the bracketed references apply to the discriminator 252 in FIG. 6).

An impulse or pulse sequence with the frequency $f_N$ is delivered to one input 212 of the phase discriminator 213, and a pulse sequence with the frequency $f_{R2}$ to the other input 226. Both pulse sequences are rectangular in shape with a pulse/gap ratio of at least approximately 1 : 1.

The input 212 is connected through a line 401 to the clock input 402 of a flip-flop 403, for example of the SN7474N type manufactured by Texas Instruments. A positive voltage is permanently delivered in the form of a logic signal 1 from a terminal 406 through a line 405 to the data input 405 of this flip-flop 403. The Q̄-output 407 of the flip-flop 403 is connected to the clearing input 410 of the flip-flop 403 through two series-connected inverters 408 and 409 acting as a delay element.

Similarly, the input 226 is connected through a line 411 to the clock input 412 of a flip-flop 413. A type SN7474N flip-flop, for example, also can be used for the flip-flop 413. The positive voltage is permanently delivered in the form of a logic signal 1 from a terminal 416 through a line 415 to the data input 414 of this flip-flop 413. The Q̄-output 417 of the flip-flop 413 is connected to the clearing input 420 of the flip-flop 413 through two series-connected inverters 418 and 419 acting as a delay element.

The Q̄-output 407 of the flip-flop 403 is connected through a line 421 to the clock input 422 of another flip-flop 423, for example of the SN7474N type manufactured by Texas Instruments. The Q̄-output 417 of the flip-flop 413 is connected through a line 424 to the setting input 425 of the flip-flop 423. The Q̄-output 426 of the flip-flop 423 is connected through a line 427 to the output 226 of the phase discriminator 213. At its output 226, the phase discriminator 223 releases a pulse-duration-modulated signal $U_P$ whose direct-current component is governed by the phase difference between the two pulse sequences delivered to the inputs 212 and 226.

Figure 9:
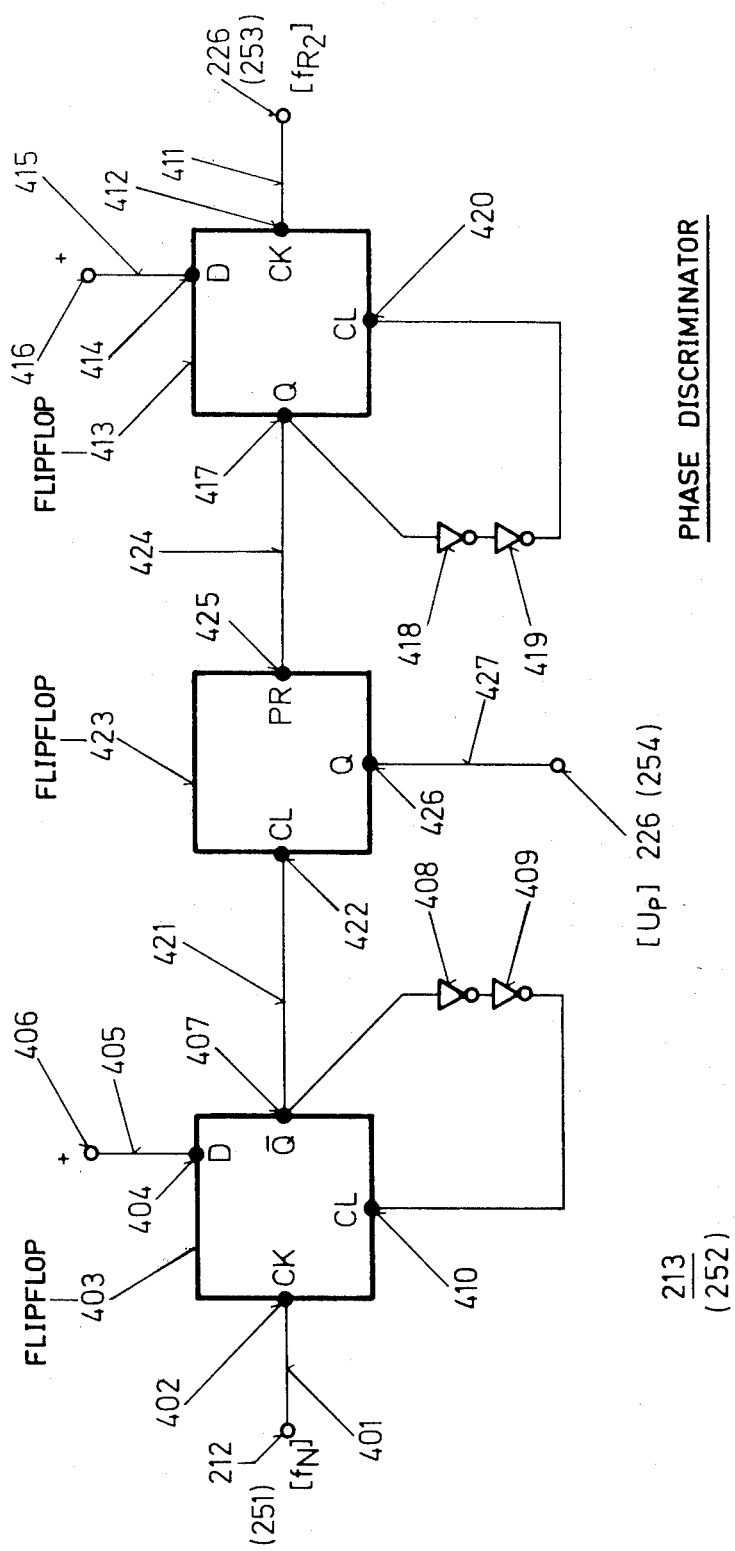
FIG. 9 is a circuit diagram of a phase discriminator.
Figure 10:
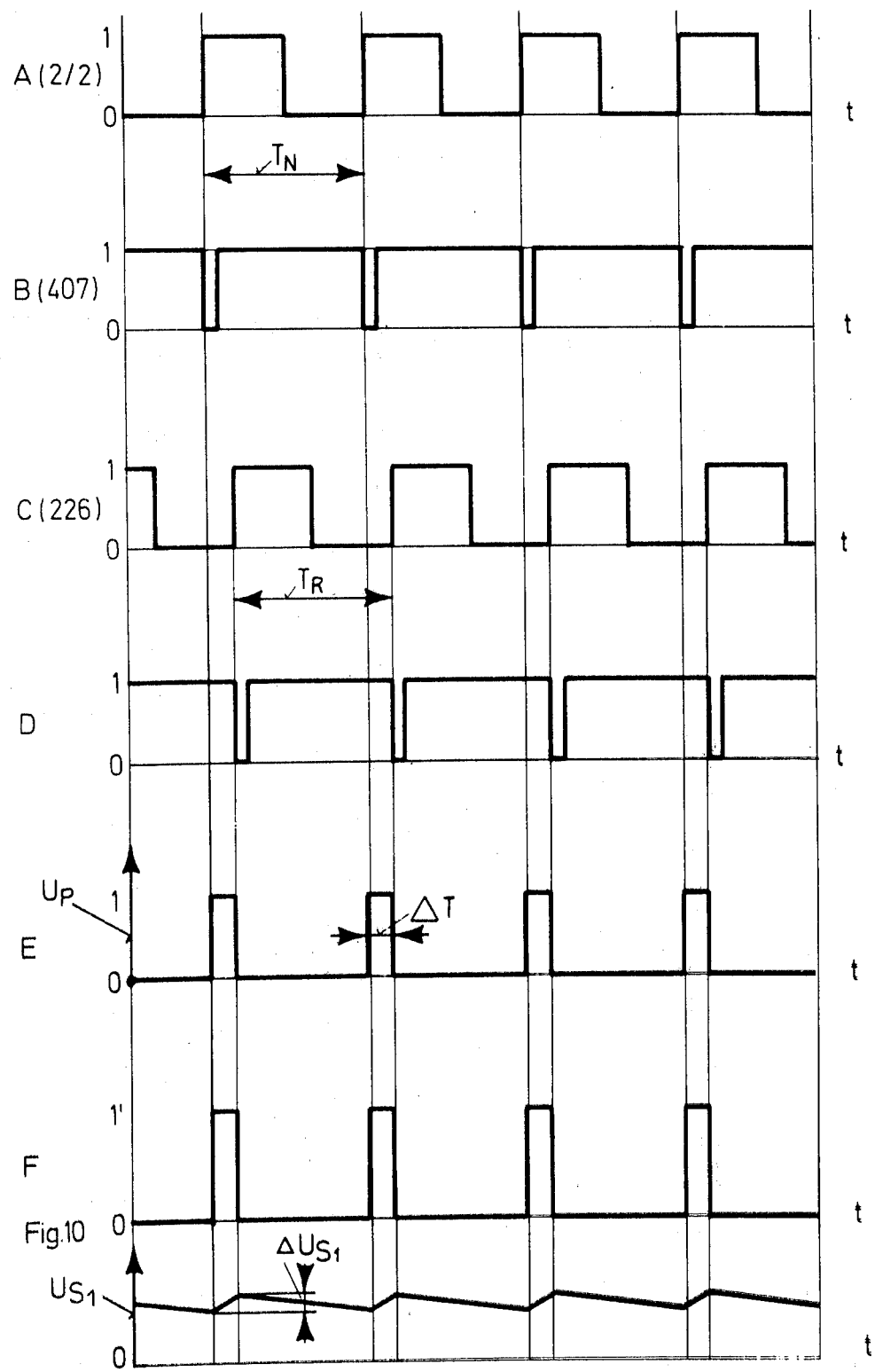
FIG. 10 shows impulse diagrams of the phase discriminator.
Figure 11:
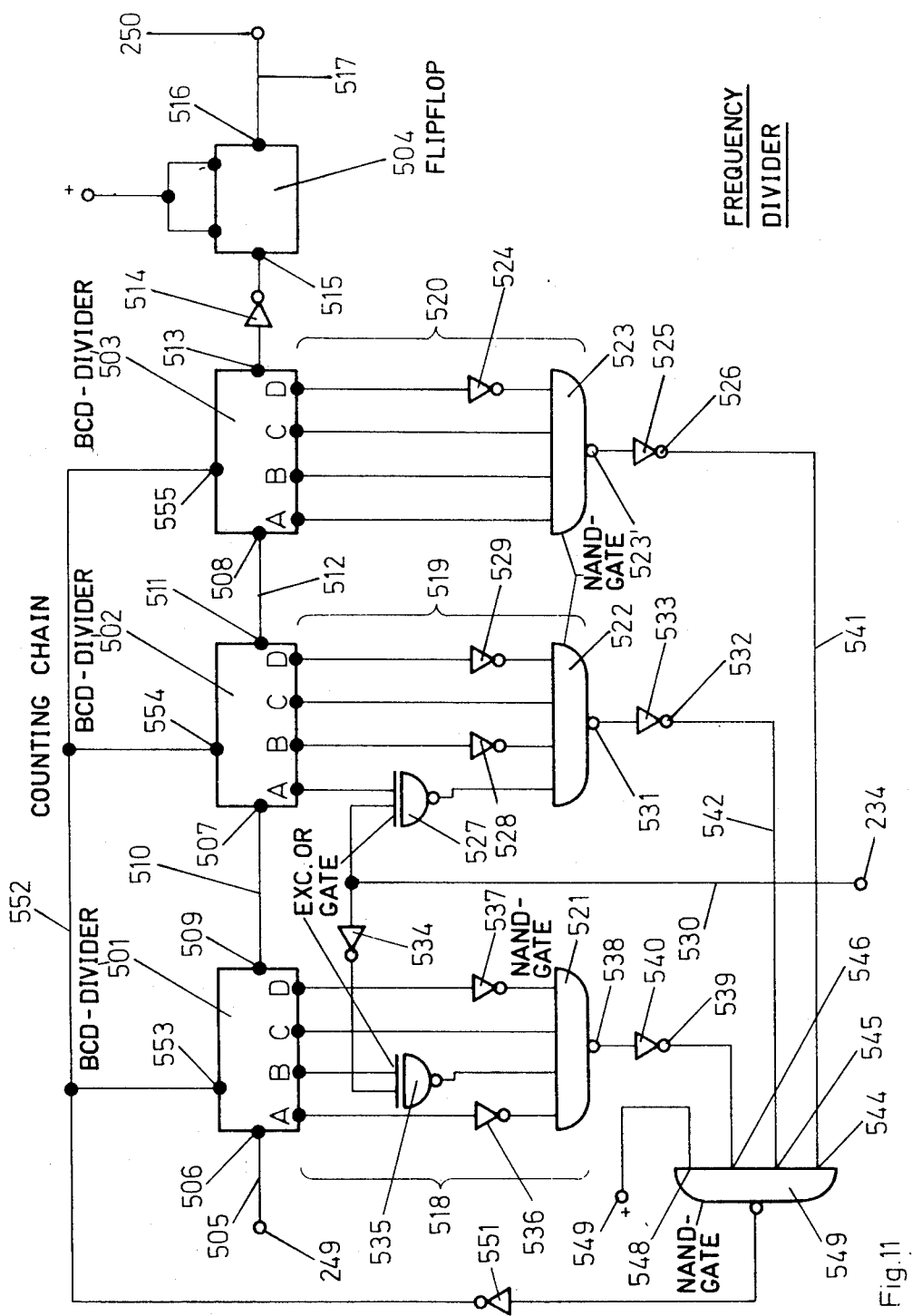
FIG. 11 is a circuit diagram of a reversible or switchable frequency divider.

FIG. 10 shows an exemplary course as a function of time of signals at certain switching points of the phase discriminator shown in FIG. 9, of the kind which occur on account of the circuit selected and the impulse sequences delivered. Line A shows the course of the impulse sequence delivered to the input 212 with the frequency $f_N$. $T_N$ is equal to the period of the mains frequency $f_N$. The line B shows the course of the signal at the Q̄-output 407 of the flip-flop 403. A brief impulse directed towards logic signal O appears at this Q̄-output 407 essentially at the time of a rising flank of the pulse sequence according to line A, its pulse duration being largely determined by the delay time of the delay element formed by the two inverters 408 and 409, and by the running time of the flip-flop 403.

Similarly, line C shows the course of the impulse or pulse sequence delivered to the input 226 with the frequency $f_{R2}$. $T_R$ is equal to the period of the second reference frequency $f_{R2}$. The line D shows the course of the signal at the Q̄-output 417 of the flip-flop 413. A brief impulse directed towards logic signal O appears at this Q̄-output 417 essentially at the time of a rising flank of the impulse sequence according to line C, its pulse duration being largely determined by the delay time of the delay element formed by the two inverters 418 and 419, and by the running time of the flip-flop 413.

The signals according to lines B and D are delivered to the clock input 422 and setting input 425 of the flip-flop 423, so that the flip-flop 423 releases an impulse or pulse sequence according to line E at its Q̄-output 426. As can be seen from FIG. 10, the pulse duration of the pulses occurring in this pulse sequence is governed by the relative position of the rising flanks of the two pulse sequences according to lines A and C delivered to the phase discriminator 213. Accordingly, the signal $U_P$ at the Q̄-output 426 of the flip-flop 423 is a pulse-duration modulated pulse sequence.

This pulse sequence is preferably amplified, cf. line F. The amplified signal according to line F is then passed through a low-pass filter 230 (cf. FIG. 6) in order to obtain a d.c. voltage signal $U_{S1}$ governed by the relative phase position between the two pulse sequences of lines A and C. (In the case of the phase discriminator 254, its output signal is delivered to the low-pass filter 256).

Figure 6:
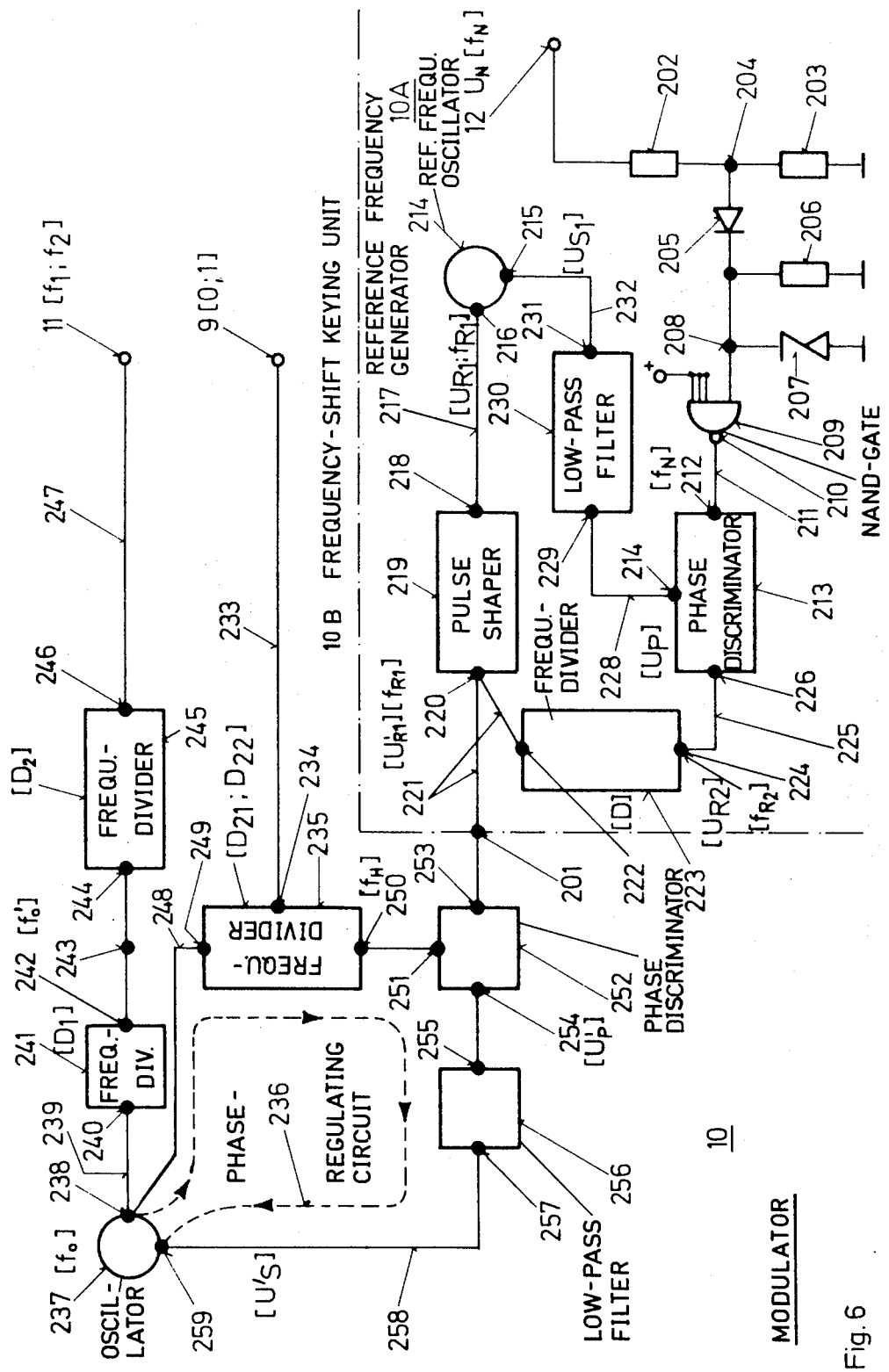
FIG. 6 shows the structure of a modulator.

The control signal $U_{S1}$ or $U_S'$ obtained in this way controls the frequency of the controlled oscllator 214 or 237 (cf. FIG. 6). Accordingly, the ripple $U_{S1}$ of the control signal $U_{S1}$ has to be kept sufficiently small in order to avoid undesirable interference-frequency modulation. For the purposes of the present embodiment, the low-pass filter 230 can be in the form of an RC-section. In view of the hard frequency-shift keying of the controllable oscillator 237, however, a third-degree phase-linear filter has proved to be of greater advantage than an RC-section for the low-pass filter 256.

One embodiment of a reversible or switchable frequency divider 235 (cf. FIG. 6) will now be described with reference to FIG. 11. FIG. 11 is a circuit diagram of a frequency divider which can be switched to two different divisors $D_{21}$ and $D_{22}$ by the delivery of a logic signal 0 or 1. The structure and mode of operation of the reversible frequency divider is described with reference to the case where the first divisor $D_{21}$ is equal to 1492 and the second divisor $D_{22}$ equal to 1508, corresponding to the embodiment on which this description is based. However, other divisors also can be similarly realized. The numerical value 1492 is split into the product 2.746 and the numerial value 1508 into the product 2.754. Division with the divisor 2 is common to both divisors $D_{21}$ and $D_{22}$. Accordingly, it is only necessary to realize the two auxiliary divisoers $D_{21}'$ equal to 746 and $D_{22}'$ equal to 754. Division with the divisor 2 is carried out in known manner by means of a JK-flip-flop which follows the reversible divider for the divisors $D_{21}'$ and $D_{22}'$.

To realize the divisor $D_{21}'$ or $D_{22}'$, the reversible divider 235 comprises three binary-coded counters connected in cascade or tandem, BCD-counters in short, for example of the SN7490N type manufactured by Texas Instruments. One decimal place of the divisor $D_{21}'$ or $D_{22}'$ is associated with each BCD-counter, the BCD-counter 501 being provided for the units, the BCD-counter 502 for the tens and the BCD-counter 503 for the hundreds. Since, in the present example, both divisors $D_{21}'$ and $D_{22}'$ coincide in regard to the hundreds, i.e. have the number 7, the third BCD-counter 503 does not have to be reversible i.e. switchable. By contrast, the two divisors $D_{21}'$ and $D_{22}'$ differ from one another both in regard to the units and in regard to the tens, namely 6 and 7 and 4 and 5.

The counting chain formed by the BCD-counters 501 . . . 503 is followed by a JK-flip-flop 504, for example of the SN7173N type manufactured by Texas Instruments, by means of which division with the divisor 2 is carried out in known manner in order, ultimately, to realize the required divisors $D_{21}$ equal to 1492 and $D_{22}$ equal to 1508.

Each of the BCD-dividers 501 ... 503 has four outputs A, B, C, D. The relationship between the number $n$ of pulses delivered to each of the counters at its clock input 506, 507 or 508, strictly speaking the negative flanks of these pulses, and the logical signals appearing at the aforementioned outputs A ... D, is shown in the function or truth table in FIG. 12.

The output 509 of the first BCD-counter 501 is connected through a line 510 to the input 507 of the second BCD-counter 502. The output 511 of the second BCD-counter 502 is connected through a line 512 to the input 508 of the third BCD-counter 503. The output 513 of the third BCD-counter is connected through an inverter 514 to an input 515 of the JK-flip-flop 504. An output 516 of this JK-flip-flop 504 is connected through a line 517 to the output 250 of the reversible divider 235.

Gate circuits 518, 519 and 520 are associated with the BCD-counters 501, 502 and 503, respectively, at their outputs A ... D. These gate circuits 518 ... 520 are designed in such a way that they enable a certain count of the associated BCD-counter to be recognized from the logical signals appearing at the outputs A ... D. The aforementioned gate circuits 518 ... 520 each have quadruple NAND-gates 521, 522 and 523, respectively, whose inputs are connected partly directly, partly through inverters and partly through an Exclusive-OR gate, to the associated outputs A, B, C, D of the binary counters 501 and 502, as shown in FIG. 11. The logical signals 1 1 1 0 appear at the outputs A ... D of the third BCD-counter 503 for the number 7. Accordingly, for recognizing this count 7 of the third BCD-counter 503, its outputs A, B and C are directly connected to the first, second and third inputs, respectively, of the associated NAND-gate 523, whereas its output D is connected through an inverter 524 to the fourth input of the NAND-gate 523. Accordingly, the logical signals 1 appear at all the inputs of the NAND-gate 523 and, hence, the logical signal 0 at its output 523' for the 7 count i.e. counter state 7 of the third BCD-counter 503. This logical signal 0 is inverted in an inverter 525, so that, for the 7 count of the third BCD-counter 503, the logical signal 1 appears, and only then at the output 526 of the inverter 525.

The second BCD-counter 502 is used to determine the tens of the divisor $D_{21}'$ or $D_{22}'$. This should be four for the divisor $D_{21}'$ and five for the divisor $D_{22}'$.

Accordingly, the gate circuit 519 associated with the second BCD-counter 502 is designed in such a way that it recognizes the count 4 or 5, depending on whether the logical signal 0 or 1 is applied to the input 234.

In the case of the 4 count, the logical signal 0, 0, 1 or 0 appears at the output A, B, C or D respectively of the BCD-couner 502. By contrast, the logical signals 1 0 1 0 appear in the case of the 5 count. In order to recognize the 4 count in the BCD-counter 502, i.e. when the logical signal 1 appears at each of the inputs of the NAND-gate 522 of its gate circuit 519, the connection between the outputs A, B, C, and D of the BCD-counter 502, and the first, second, third and fourth inputs of the NAND-gate 522 is established as follows in FIG. 11. The output A is connected through the Exclusive-OR gate 527 to the first input of the NAND-gate 522.

The logical signal applied to the input 234 is delivered to another input of the Exclusive-OR gate 527 through a line 530. For recognizing the 4 count in the BCD-counter 502, this logical signal at the input 234 is equal to 0, so that the Exclusive-OR gate 527 inverts the logical signal 0 appearing at the output A of the BCD-counter 502 for the 4 count, with the result that a logic signal 1 appears at the first input of the NAND-gate 522. For the 4 count of the BCD-counter 502, the logic signal 0 appears at the output B of this counter. This signal is delivered through the inverter 528 to the second input of the NAND-gate 522 as a logic 1 signal. For the 4 count of the BCD-counter 502, the logic signal 1 appears at its output C, being delivered directly to the third input of the NAND-gate 522. For the 4 count of the BCD-counter 502, the logic signal 0 appears at the output D, being delivered, after inversion by the inverter 529, to the fourth input of the NAND-gate 522 in the form of logic signal 1. If, therefore, the signal logic 0 appears at the input 234, the output 531 of the NAND-gate 522 then, and only then, carries the signal logic 0 and the output 532 of a following inverter 533 the signal logic 1 when the count of the BCD-counter 502 is equal to 4.

If the signal logic 1 is delivered to the input 234 of the reversible divider 235, the divisor $D_{22}'$ is equal to 754, in other words 5 tens have to be recognized in the second BCD-counter 502. For the 5 count of the second BCD-counter 502, its output A carries the logic signal 1. Due to the logic signal 1 which is then delivered to the second input of the Exclusive-OR gate 527 through the line 530, this Exclusive-OR gate 547 then delivers the logic signal 1 to the first input of the NAND-gate 522. The logic signal 0 appearing at the output B of the BCD-counter 502 for the 5 count is inverted by means of the inverter 528 and delivered as a logic signal 1 to the second input of the NAND-gate 522. For the 5 count, the output C of the second binary counter 502 carries the signal logic 1, so that this signal can be immediately delivered to the third input of the NAND-gate 522. By contrast, the output D of the second BCD-counter 502 carries the logical signal 0 for the 5 count. By means of the inverter 529, this logical signal 0 is delivered as a logic signal 1 to the fourth input of the NAND-gate 522. Accordingly, the logic signal 0 only appears at the output 531 of the NAND-gate 522 for the 5 count, while the logic signal 1 appears at the output 532 of the inverter 533 if at the same time the logical signal 1 is present at the input 234. Accordingly, the gate circuit 519 associated with the second BCD-counter 502 can be switched over to recognize the count 4 or 5 by delivery of the logic signal 0 or logic signal 1 to the input 234 of the reversible divider 235.

The gate circuit 518 of the first BCD-counter 501 is also reversible. The logical signal 1 applied to the input 234 is inverted through an inverter 534 and delivered to an input of an Exclusive-OR gate 535 following the output B of the first BCD-counter 501. The outputs A and D of the first binary counter 502 are followed by inverters 536 and 537.

The first BCD-counter 501 is associated with the units or units place of the divisor $D_{21}'$ or $D_{22}'$. To adjust the divisor $D_{21}'$, the logical signal 0 is delivered to the input 234, and the gate circuit 518 then has to be programmed to recognize the last place of the divisor $D_{21}'$. In the exemplary embodiment under discussion, $D_{21}'$ is equal to 746, so that, for the 6 count of the first BCD-counter 501, the gate circuit 518 has to deliver the logical signal 1 to all 4 inputs of the NAND-gate 521. In our example $D_{22}'$ is equal to 754, so that, for the 4 count of the first BCD-counter 501, the gate circuit 518 has to deliver the logical signal 1 to all 4 inputs of the NAND-gate 521. The gate circuit 518 is switched to recognize the 6 count associated with the divisor $D_{21}'$ or the 4 count associated with the divisor $D_{22}'$, by delivering the logical signal applied to the input 234 of the reversible divider and inverted in the inverter 534 to another input of the Exclusive-OR gate 535. As a result of this measure, when the logical signal 0 is present at the control input 234 of the reversible divider 235, the logic signal 0 only appears at the output 538 of the NAND-gate 521 for the 6 count of the BCD-counter 501, and hence the logic signal 1 appears at the output 539 of the inverter 540 following the NAND-gate 521. If, by contrast, the logical signal 1 is present at the control input 234, the output 539 of the inverter 540 releases a logical signal 1 for the 4 count of the first BCD-counter 501.

The logical signals appearing at the outputs 526, 532 and 539 of the gate circuits 520, 519 and 518 are delivered through the lines 541, 542 and 543 to the inputs 544, 545 and 546, respectively, of a NAND-gate 547. One input 548 of this NAND-gate is permanently connected to a terminal 549 which is at a positive voltage corresponding to the logical signal 1. It is only when all the gate circuits 518, 519 and 520 have determined the particular correct count that logical signals 1 appear at all four inputs of the NAND-gate 547 and hence the logical signal 0 at its output 549. The logical signal 0 is inverted in a following inverter 551 and delivered through a line 552 to the clearing inputs 553, 554 and 555 of the BCD-counters 501, 502 and 503, respectively, so that the chain consisting of these BCD-counters is reset to zero after reaching a total count corresponding to the divisor $D_{21}'$ or $D_{22}'$. An impulse then appears at the output 513 of the last BCD-counter 503, being delivered through the inverter 514 to the JK-flip-flop 504. At its output 516, the JK-flip-flop 504 releases one pulse to the output 250 of the reversible divider for every two pulses delivered, so that the total divisor $D_{21}$ or $D_{22}$ is realized.

The frequency dividers 241 and 245 for the divisor $D_1 = 100$ and $D_2 = 600$ are similarly designed.

Accordingly, a signal with the frequency $f_1$ or $f_2$, in the present case 124.333 c/s or 125.666 c/s, is released at the output 11 of the modulator 10, depending on whether the binary signal 0 or 1 is present at its output 9. This signal is delivered as a control signal to the input 13 of the transmitter 14 through the line 12, cf. FIG. 2.

As already mentioned, the transmitter can be in the form of, for example, an amplifier of adequate output or a static inverter controlled by the frequency-shift-keyed signal at the input 13 of the transmitter. Amplifiers and inverters of this type are known and, for this reason, will not be here described in detail.

In view of the relatively low value of the signal frequency, the output available at the output 15 of the transmitter 14, amounting for example to between a few hundred watts and a few kW, is coupled preferably by series feeding into the power line K leading from the secondary side of the feed transformer d (cf. FIG. 2) to the busbar $k^*$.

Figure 13:
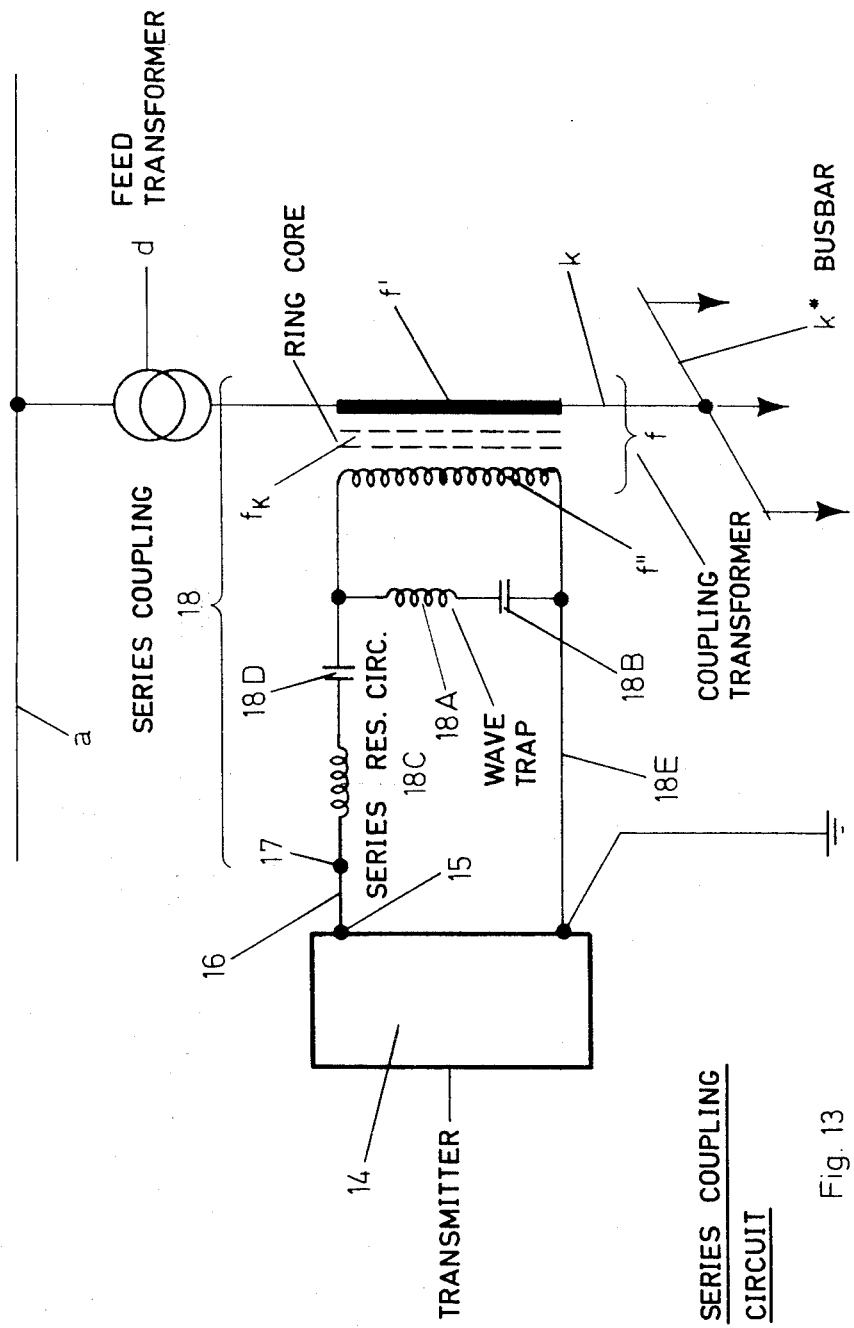
FIG. 13 shows one embodiment of a series input circuit for coupling the transmitted signal into a power line.

FIG. 13 shows one embodiment of a series coupling. The series coupling 18 is the link between the transmitter 14 and the heavy-duty busbar $k^*$. A so-called bar-type current transformer is arranged as coupling transformer $f$ between the secondary side of the feed transformer $d$ and the busbar $k^*$. The use of a bar-type current transformer as coupling transformer $f$ has the distinct advantage that bar-type current transformers of this kind can be made absolutely short-circuit-proof. In this case, the primary winding $f'$ consists of a solid conductor guided through a ring core $f_k$. The secondary winding $f''$ has $n$ turns. In cases where a bar-type current transformer is used for measuring purposes, the secondary winding $f_2$ is loaded by a low-resistance load so that the transformer is always prone to short-circuiting. In our application of a bar-type current transformer, a series-tuned wave trap consisting of the coil 18A and the capacitor 18B is provided as mains-frequency load on the secondary side. The resonance frequency of this series-tuned wave trap is equal to the mains frequency, in our case 50 c/s. Accordingly, the mains-frequency load of the bar-type current transformer substantially corresponds to the equivalent series resistance of this series-tuned wave trap.

The audiofrequency signal power is delivered from the output 15 of the transmitter 14 to the seconary winding $f''$ of the bar-type current transformer through a series resonant circuit, consisting of a coil 18C and a capacitor 18D, and a line 18E. the line 18E is preferably also connected to ground.

In the present case, the series input illustrated in FIG. 13 also can be carried out by means of a bar-type current transformer because, by virtue of the angle of frequency modulation applied, the signal level on the busbar $k^*$ only has to amount to about 1‰ of the mains voltage previling there. Accordingly, a signal level of only 10 V is required for a bushbar voltage of, for example, 10 kV. In a conventional ripple-control system, the signal level would have to be some 10 to 30 times higher. It is only by virtue of this relatively low level, amounting to only 10 V, that this can be obtained with a bar-type current transformer having only one primary winding.

Accordingly, the angle modulation used not only has the advantage of effectively solving the spillover problem, it also enables a short-circuit-proof coupling system incorporating a bar-type current transformer to be used.

The remote-control signals coupled by means of the coupler 18 into the cable K leading to the busbar $k^*$, pass from the busbar into the entire energy distribution network connected therewith. The aforementioned remote-control signals can be selectively coupled out of the energy-distribution network at any points thereof, and can be evaluated, i.e. used for remote-control functions.

An exemplary embodiment of a receiver 600 for the remote-control commands referred to above will now be described with reference to FIGS. 14 to 18.

Figure 14:
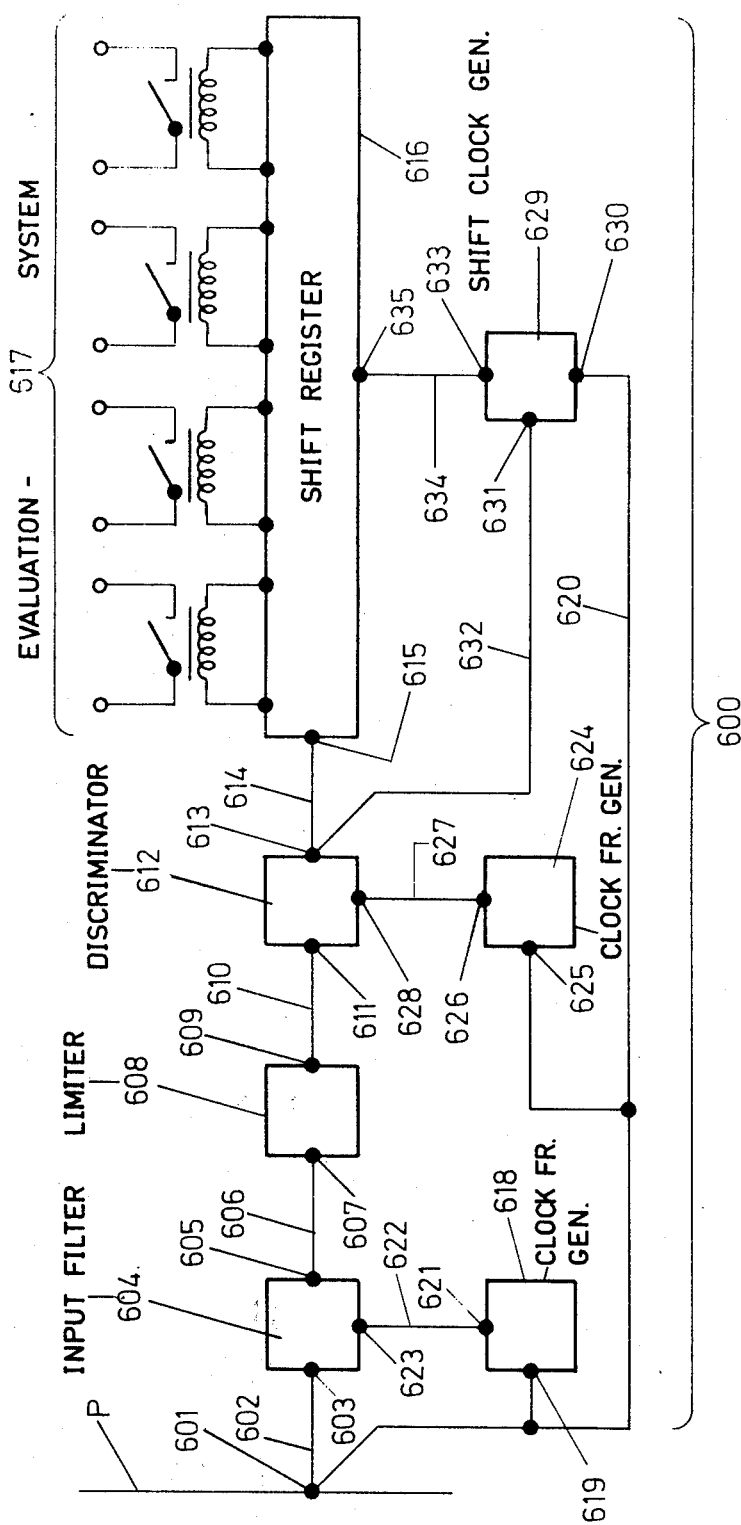
FIG. 14 is a circuit diagram of a receiver.

FIG. 14 shows a block circuit diagram of a remote-control receiver 600 which is suitable for receiving and evaluating the aforementioned angle-modulated, in our case frequency-shift-keyed, remote control signals (cf. FIGS. 4 and 7). An input terminal 601 of the remote-control receiver 600 is connected to a phase conductor P of the energy-distribution network. Accordingly, both the mains voltage $U_N$ with the frequency $f_N$, and also its harmonics which usually occur in power supply systems, and the remote-control signals superimposed upon the mains voltage $U_N$ with the frequencies $f_1$ and $f_2$, are present at the input terminal 601. All these frequencies are delivered through a line 602 to an input 603 of an input filter 604. The object of the input filter 604 is only to deliver signals in the range from $f_1 \ldots f_2$ at its output 605, but to weaken all other signals as far as possible so that, at the output 605 of the input filter 604, they have a lower level than the remote-control signals with the frequencies $f_1$ and $f_2$.

The signals appearing at the output 605 of the input filter 604 are delivered through a line 606 to the input 607 of a limiter 608. Signals appearing at the output 609 of the limiter 608 do not exceed a certain level and are delivered through a line 610 to an input 611 of a discriminator 612. An impulse or pulse sequence according to FIG. 4, line A, is again obtained from the angle-modulated remote-control signals received in the discriminator 612, being delivered from the output 613 of the discriminator 612 through a line 614 to an information nput 615 of a shift register 616.

The shift register 616 has associated with it an evaluation system 617 which can consist, for example, of a relay arrangement associated with the individual stages of the shift register 616.

In view of the relatively narrow system band width in the present case, it is of advantage to control the transmission characteristic of at least part of the input filter 604 in dependence upon the actual value of the mains frequency $f_N$. To this end, a clock frequency generator 618 is associated with the input filter 604, its control input 619 being connected through a line 620 to the input terminal 601, so that inter alia a mains-frequency control signal is delivered to the control input 619. At a clock output 621, the clock frequency generator 618 delivers a clock-pulse sequence which bears a certain relationship to the mains frequency $f_N$ and which is designed for example to operate an N-path filter incorporated in the input filter 604, through a line 622 to another input 623 of he input filter 604.

In view of the low frequency shift provided in our example, it is of advantage to bind the discriminator 610, in regard to its frequency characteristic, in a fixed relationship to the mains frequency $f_N$ because, from what has already been explained, the two remote-control frequencies $f_1$ and $f_2$ are also strictly related to the mains frequency $f_N$.

For this purpose, another clock frequency generator 624 is associated with the discriminator 612. A mains-frequency control signal is also delivered through the line 620 to the control input 625 of the other clock frequency generator 624. At its output 626, the other clock frequency generator 624 also delivers a clock pulse sequence through a line 627 to another input 628 of the discriminator 612 for controlling the transmission characteristic of the discriminator 612.

Finally, a shift clock generator 629 is associated with the shift register 616. A mains-frequency control signal is delivered to a first control input 630 of the shift clock generator 629 through the line 620, whereas the pulse sequence appearing at the output 613 of the discriminator 612 is delivered to another control input 631. To control the shift register 616, a clock output 633 of the shift clock generator 619 is connected through a line 634 to a clock input 635 of the shift register 616.

The remote-control receiver 600 has to meet exceptionally high demands. This is easy to appreciate when it is considered that, in addition to the remote-control signals with the freqencies $f_1$ and $f_2$ and an intelligence or useful signal level of only about 100 mV, external voltages of considerably greater strength also occur at the input terminal 601 of the remote-control receiver 600. Thus, the mains voltage $U_N$ of, for example, 220 V and 50 c/s and its harmonics, amounting up to a few 10 V, are also present at the input of the receiver 600.

In our example, it is assumed that the useful signals have the frequencies $f_1 = 124.333$ c/s and $f_2 = 125.666$ c/s. Nearest to them are the second and third harmonics of the mains voltage at 100 and 150 c/s, the third harmonic normally appearing with much greater intensity with a voltage of, for example, up to 30 V. In addition to these discrete frequecies, the noise voltages emanating from switching operations in the power supply system also occur, amounting to between about 10 and 50 mV, based on the assumed system band width of 1.6 c/s.

As already mentioned, it is best to keep the remote-control frequencies $f_1$ and $f_2$ in a fixed relationship to the mains frequency $f_N$. Accordingly, in view of the narrow system band width and advantageously narrow band width of the receiving filter 604, it is best to allow the transmission characteristic of the input filer also to follow any fluctuation s in the mains frequency and, hence, in the remote-control frequencies $f_1$ and $f_2$.

From what has already been said, the remote-control receiver 600 or its receiving filter 604 has to exhibit extremely high dynamics in view of the large differences in level between extraneous and useful signals, and in addition must have a high level of selectivity despite narrow band width. One particularly advantageous filter arrangement for optimally solving this problem in economic terms, consists of a combination of at least one active RC-filter and at least one sampling filter, for example an N-path filter or digital filter. In addition, it is desirable for production reasons to minimize tuning work on filters and, in view of ageing effects affecting parts of the filter, it is desirable with the very narrow system band width selected in our example to use a circuit that is only minimally subjected to ageing effects of this kind.

In order to optimally meet the stringent requirements mentioned above from the economic point of view, the receiving filer 604, according to the present embodiment, has a cascade circuit of a two-pole active RC-filter and an N-path filer with a clock pulse sequence governed by the mains freuqency. Active RC-filers suiable for this purpose are described, for example, in German patent publications 2,306,452 and 2,306,453, the disclosure of which are incorporated herein by reference. N-path filters suitable for the present purpose are described for example in Germany patent publications 2,225,507 and 2,318,259, likewise incorporated herein by reference.

Figure 15A:
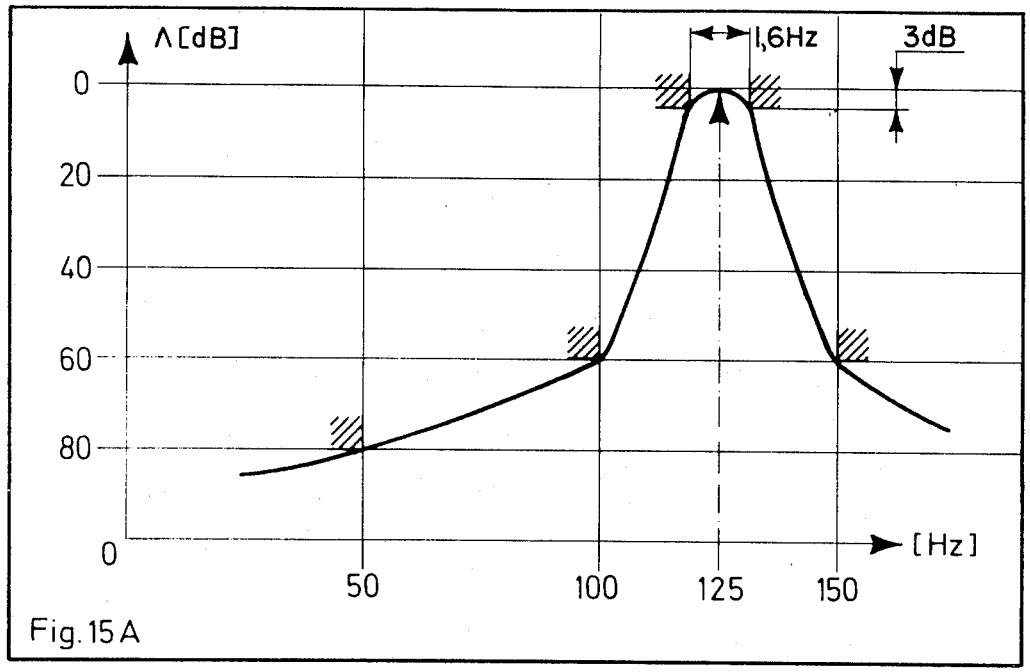
FIG. 15A shows a transmission characteristic of a receiving filter.

FIG. 15A shows the transmission characteristic of the receiving filter 604 required for the present purpose. This Figure shows the system band width or −3 dB-band width marked 1.6 c/s, the desired damping of 60 dB at 100 and 150 c/s, and the desired damping of 80 dB at the mains frequency of 50 c/s.

Figure 15B:
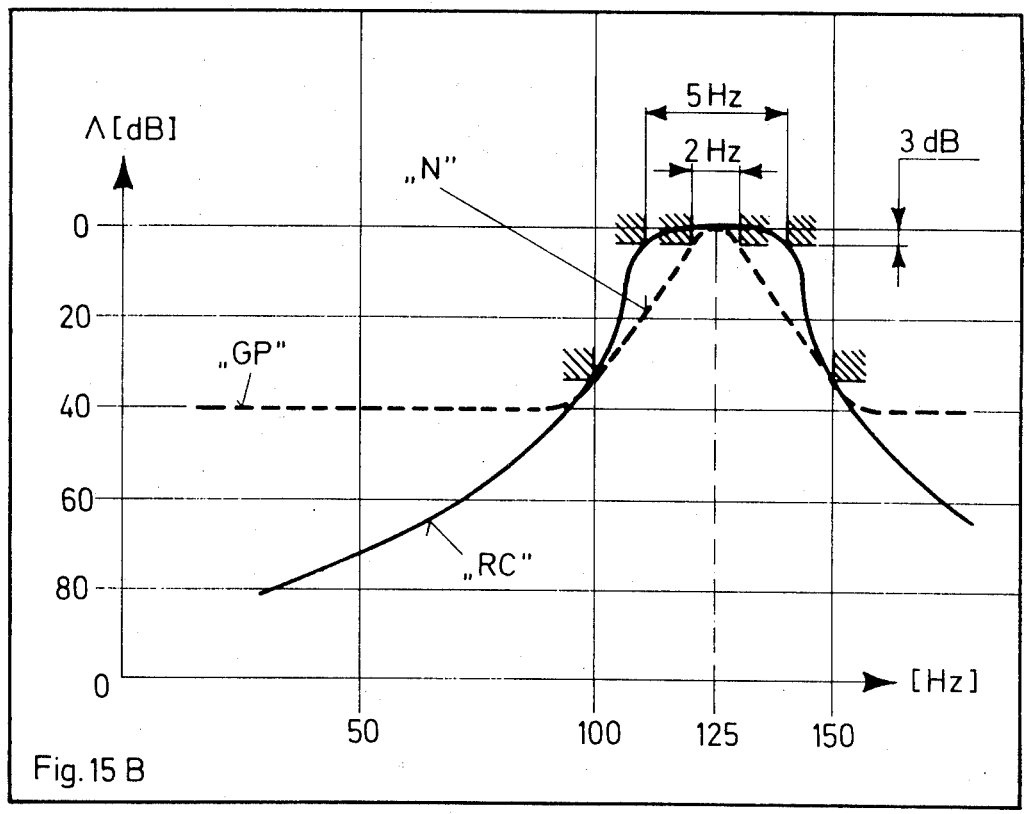
FIG. 15B shows transmission characteristics of an RC-filter and an N-path filter.

The transmission characteristics RC and N which can be obtained with an active RC-filter of the aforementioned kind and with an N-path filter, are shown in FIG. 15B on the same abscissa and ordinate scale as in FIG. 15A. It can clearly be seen that the transmission characteristic required in accordance with FIG. 15A can be realized by combining both characteristics. Although the active RC-filter on the one hand has a −3dB-band width of 5 c/s, on the other hand it advantageously possesses high far-off selectivly. The relatively high inherent noise level GP for an N-path filter, which in the present case is only some 40 dB below the useful level, also can be seen. This deficiency would make it impossible to realize the transmission characteristic shown in FIG. 15A with an N-path filter alone. However, by combining the N-path filter with a preceding two-pole active RC-filter, this high noise level of the N-path filter is rendered harmless. For the N-path filter provided in the receiving filter 604 in our example, N = 4, whereas a value of 125 c/s is selected for the resonance frequence $f^*$. This value of 125 c/s lies in the middle between the two signal frequencies $f_1$ and $f_2$. Accordingly, a frequency of $N \cdot f^* = 4 \cdot 125$ c/s = 500 c/s, is obtained as the repetition frequency for the clock pulse sequence for controlling this N-path filter. In order to bind the resonance frequency $f^*$ to the mains frequency $f_N$, as is the case with the signal frequencies $f_1$ and $f_2$, a control frequency of nominally (i.e. for a mains frequency of exactly 50 c/s) 500 c/s is delivered to the clock pulse generator of the N-path filter. This control frequency is bound to the mains freqency $f_N$ by means of a phase-regulating circuit of the kind already described with reference to FIG. 6. The time constants selected for the phase-regulating circuits are exactly the same so that the resonance frequency $f^*$ always follows changes in the mains frequency $f_N$ in exactly the same way as the signal frequency $f_1$ or $f_2$.

Figure 16:
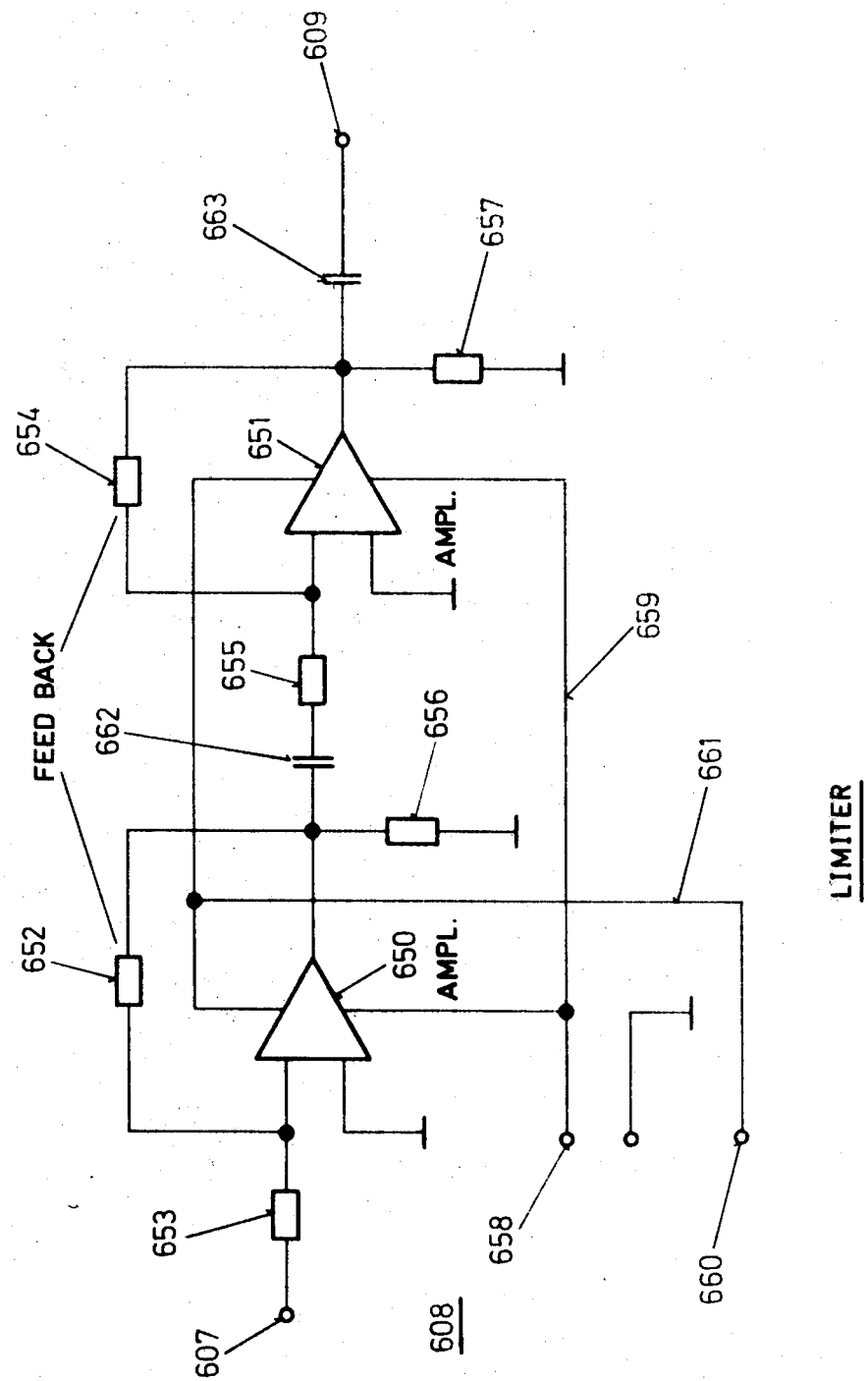
FIG. 16 is a circuit diagram of a limiter.

An embodiment of a limiter 608 (cf. FIG. 14) will now be described with reference to FIG. 16. The function of the limiter 608 in the receiver 600 is to limit all the signals appearing at the output of the receiving filter 604 to a definitive amplitude value. Limiting should take place symmetrically at all input levels, in other words the zero-axis crossing times of the input signal should not be falsified in any way. In addition, limiting should even be effective for inherent noise voltages of the preceding receiving filter 604. This guarantees that even very low useful voltages, which only slightly exceed, for example by 1 to 2db, the inherent noise based on the band width of the receiving filter 604, are satisfactorily limited and, as a result, are recognized by the receiver. This provides for effective noise-suppressing properties of the receiver 600, in addition to which spurious signals of the same frequency are rendered harmless (capture effect).

Although, basically, it would even be possible to receive and evaluate frequency-shift keyed remote-control signals without using a limiter, the effective limiting of amplitude affords the additional advantage of reducing the error probability of received remote-control signals.

The output signal of the receiving filter 604 (cf. FIG. 14) is delivered to the input 607 of the limiter 608. The limiter 608 has two stages. Each stage has an amplifier 650, 651. Examples of suitable amplifiers are the type μA 741 operational amplifiers manufactured by the well known firm Fairchild.

Each of these amplifiers has a resistive feedback path consisting of the resistances 652, 653 and 654, 655. A ballast or load resistance 656 is associated with the amplifier 650 and a ballast resistance 657 with the amplifier 651.

The positive feed or supply voltage pesent at a terminal 658 is delivered to the aforementioned amplifiers though a line 659, whereas the negative feed voltage present at a terminal 660 is delivered to these amplifiers through a line 661. The resistive feedback used stabilizes the amplification of each amplifier to a value of about 100. In order to avoid undesirable shifting of the operating point, both stages of the limiter are decoupled from one another in terms of direct current by a capacitor 662. In the present case, direct-current decoupling of this kind is acceptable by virtue of the only very narrow frequency band to be processed, namely 125 c/s ± 0.6 c/s. The output of the second amplifier 651 is connected through another capacitor 663 to the output 609 of the limiter at which appears the amplitude-limited output signal of the limiter 608.

An embodiment of discriminator 612 (cf. FIG. 14) will now be described with reference to FIG. 17. In the interests of clarity, the functions to be performed by the discriminator and its working conditions will be discussed beforehand. The function of the discriminator is to recognize, from the limited signal delivered to it by the limiter 608, the appearance of the signal $f_1$ and $f_2$, and to form a direct-current pulse sequence which as far as possible shows exactly the same time pattern as the pulse sequence formed at the transmitting end in the coder (cf. FIG. 4, line A).

In view of the relatively narrow system band width and the minimal freqency shift, and also in view of the fact that, as already described, the signal frequencies $f_1$ and $f_2$ are in a fixed relationship to the mains frequency $f_N$, thus proportionally following its fluctuations, it has proved to be of considerable advantage to also bring the frequency characteristic of the discriminator 612 into a fixed relationship with the mains frequency in similar manner. This is because a conventional fixedly tuned freqency discriminator would undergo shifts in level, hich would adversely affect reliable formation of the required directcurrent impulse sequence, under the effect of fluctuations in the signal frequencies $f_1$ and $f_2$ caused by fluctuations in the mains frequency $f_N$ due to drifting on the discriminator characteristic.

Since the frequency modulation in the present case is a binary frequency modulation, i.e. a frequency modulation in which one frequency ($f_1$) corresponds to the binary value 0 while the other frequency ($f_2$) corresponds to the binary value 1, and since in addition it is assumed that the transmitter is permanently in operation and, in the information intervals, transmits the frequency $f_1$ corresponding to the binary value 0, it is sufficient, for recognizing the information to be transmitted (cf. FIG. 4, line A) in the discriminator 612, to merely provide means for recognizing the appearance of signals with the frequency $f_2$, i.e. in our case 125.666 c/s. If $f_2$ is not recognized, it is always assumed that $f_1$ is transmitted corresponding to the binary value 0.

Due to the exact limiting effect of the preceding limiter 608, a constant signal power is always offered to the discriminator 612, irrespective of whether this signal power falls onto a discrete frequency, or occurs in wide-band form as a noise voltage. If, for example, a discrete frequency is delivered solely from the receiving filter 604 to the limiter 608, the entire power offered by the limiter 608 to the discriminator 612 is concentrated in the aforementioned spectral line of this discrete frequency. If, by contrast, white noise (or another power spectrum) is delivered to the limiter, the power available at the output of the limiter is distributed over the entire channel width (and its harmonics). The harmonics of the output signal of the limiter hardly cause any problems by virtue of the selective effect of the discriminator. In the case of discriminators in which the harmonics of the limited signal play a part, assistance can be provided in the form of a simple harmonic filter.

In the present embodiment, the way in which the discriminator 612 works is based solely on a simple spectral valuation. In other words, if the power offered by the limiter is concentrated in a single spectral line, and if this spectral line falls into the transmission range of the filter used as the frequency-selective discriminator element, this filter will obviously release a relatively high output voltage. If, by contrast, the power offered to the discriminator is distributed more or less uniformly over a relatively wide frequency range, most of the frequency mixture which represents the limiter output signal no longer falls within the discriminator transmission range by virtue of the fact that the band width of the discriminator filter is narrower than the band width of the limiter. The result of this is that the output signal of the discriminator filter is distinctly smaller than it would be were the limiter signal concentrated onto the spectral line of the filter to be delivered. This guarantees unequivocal recognition of the binary value 1 which is distinguished by the power concentrated to the frequency $f_2$. The absolute output voltage of the discriminator filter can be taken as a measure of the spectral power density and, accordingly, a threshold-value arrangement can be provided for rating the output signal of the discriminator in order to uniquivocally recognize the binary value 1. Adjustment of the threshold value is by no means critical and is independent of the receiver input voltage values, because amplitude is of course sharply limited between them. Accordingly, the aforementioned arrangement in fact only rates the frequencies of the input signal without taking its amplitude into account. In practice, the threshold-value arrangement is very easy to form; for example, the limiter always releases a voltage limited to 24 volts $_{pp}$ irrespective of signal strength, so that it is also possible to work with a constant threshold-value.

Figure 17:
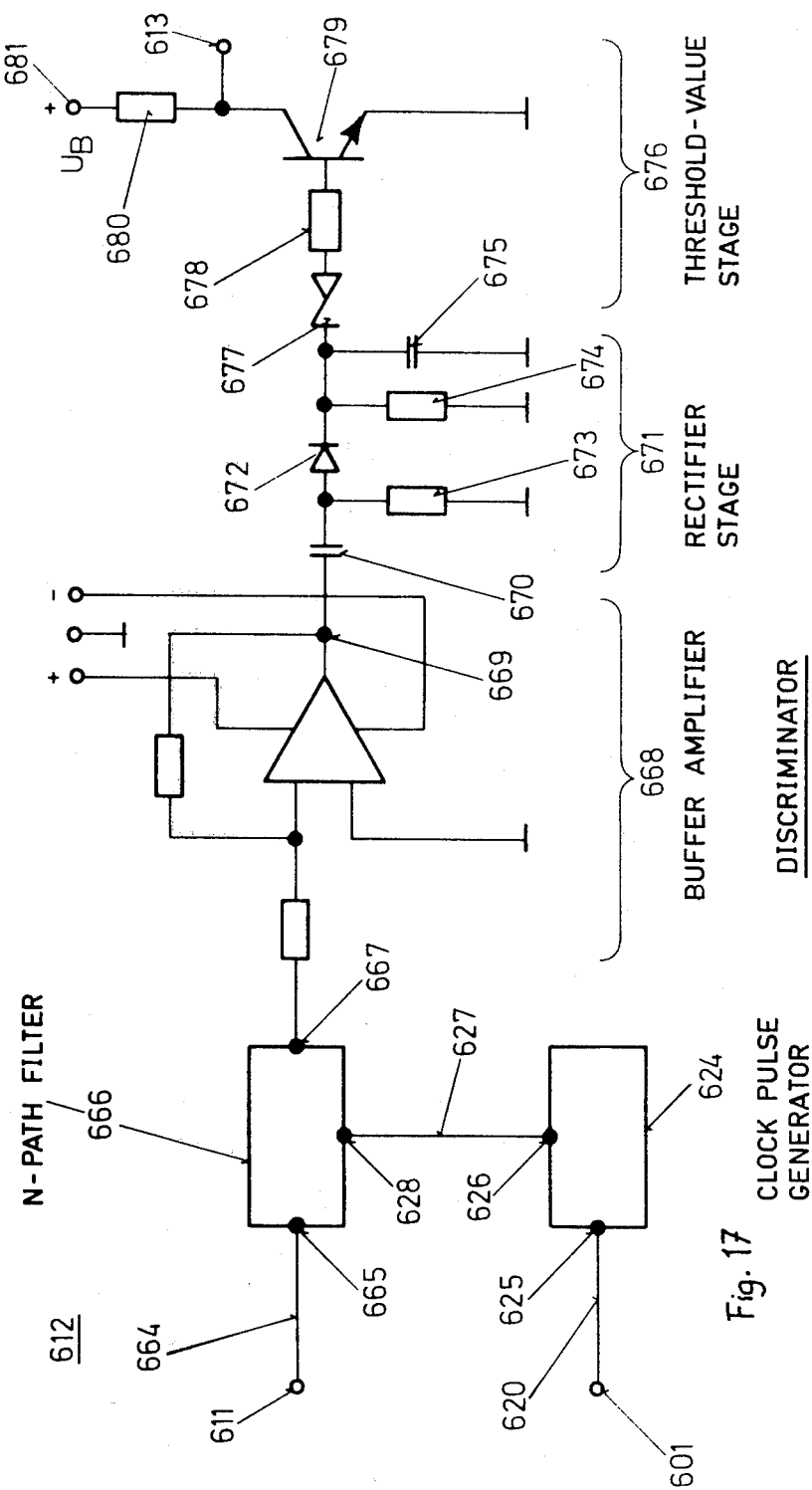
FIG. 17 is a circuit diagram of a discriminator.

FIG. 17 shows a circuit diagram of an exemplary embodiment of discriminator 612. The output signal of the limiter 608 is delivered to the discriminator 612 at its input terminal 611, from which it is delivered through a line 664 to an input 665 of an N-path filter 666. The N-path filter 666 is designed in such a way that, with a band width of about 1 c/s, it only allows through the frequency $f_2$, i.e. in our case 125.666 c/s. In view of the publications referred to earlier on, namely German patent publications 2,225,507 and 2,318,259, here is no need here for further comments on the N-path filter 666, except to say that the clock pulse generator 624 associated with it must supply a frequency of 4.125.666 c/s = 502.668 c/s in accordance with the required transmission frequency of 125.666 c/s and the number of paths used in the present case (N = 4). As already mentioned, this frequency should proportionally follow fluctuations in the mains frequency $f_N$. To this end, the clock impulse generator 624 comprises a phase-locked loop which is associated with a controllable oscillator of 5.02668 mc/s. The required frequency, in our case 502.6668 c/s, is produced by frequency division from the frequency of the controllable oscillator in the manner already described. A frequency divider with the divisor 10,000 is required for this purpose. On the other hand, the frequency 5.02668 mc/s is divided by a fixed-program frequency divider with the divisor 10,053 to the value 500.018 c/s which substantially corresponds to ten times the ideal mains frequency. By means of the aforementioned phase-locked loop, this frequency obtained by division with the divisor 10,053 is compared with a reference frequency of 500 c/s obtained from the mains frequency, and a control voltage for the controllable oscillator is formed through a phase discriminator and a low-pass filter in such a way that the controllable oscillator oscillates at 5.02668 mc/s for a mains frequency of 50.0018 c/s, which is virtually the ideal mains frequency. In this way, a highly selective discriminator filter is obtained by means of an uncritical structure, its main advantage over discriminators with tunable resonance circuits being that no tuning work is necessary, neither does detuning occur through ageing filter components.

The output 667 of the N-path filter 666 is followed by a buffer amplifier 668 with feedback to the amplification factor +1 which has a high input impedance, but a low output impedance and which, therefore, imposes hardly any load on the N-path filter 666 while at the same time representing a low-resistance source for the signal to be further processed. For example, an integrated circuit of type $\mu$A 741 manufactured by Fairchild can be used in the amplifier 668. On reception of a signal with the frequency $f_2$, an a.c. voltage with the frequency $f_2$, whose value although independent of the strength of the input signal is nevertheless defined, appears at the output 669 of the amplifier 668. If, however, an input signal with the frequency $f_1$ is present at the receiver 600, an a.c voltage with a distinctly lower level appears at the output 669. The output signal of the amplifier 668 is delivered through a coupling capacitor 670 to a rectifier stage 671 consisting of a diode 672, the resistors 673 and 674 and a capacitor 675. The time constant of this rectifier stage is largely determined by the RC-section formed by the resistance 674 and the capacitor 675. This time constant is preferably about ten times greater than the cycle duration of the frequency to be rectified. In our example, $f_2 = 125$ c/s, while a value of 80 ms is selected as the time constant.

The rectifier stage 671 is followed by a threshold-value stage 676. The threshold-value stage 676 consists of a Zener diode 677, a base resistance 678 and a transistor 679 with a collector resistance 680.

Only input voltages whose amplitude is greater than the Zener voltage of the Zener diode 677, increased by the starting voltage of the transistor 679, are able to drive the transistor 679 hard. Lower input voltages remain ineffective. The Zener voltage is peferably selected in such a way that it lies substantially in the middle between the voltage values at the capacitor 675 which appear at the input 601 of the receiver for an input signal with the frequency $f_2$ an $f_1$. The collector voltage of the transistor 679 is equal to 0 during the appearance of an input signal with the frequency $f_2$, and only then, i.e. with the transistor 679 driven hard, but is equal to the feed voltage $U_B$ at the terminal 681 for other input signals or in the absence of a signal due to the noise voltage occurring in that event on account of different spectral distribution. This value can count as logic signal 1. Accordingly, a pulse sequence with the logic signal values 0 and 1, inverse to the transmitted pulse sequence (cf. FIG. 4, line A), appears at the output terminal 613 connected to the collector of the transistor 679. This invention has to be taken into consideration or eliminated by an inverter for subsequent evaluation of this pulse sequence.

Figure 18:
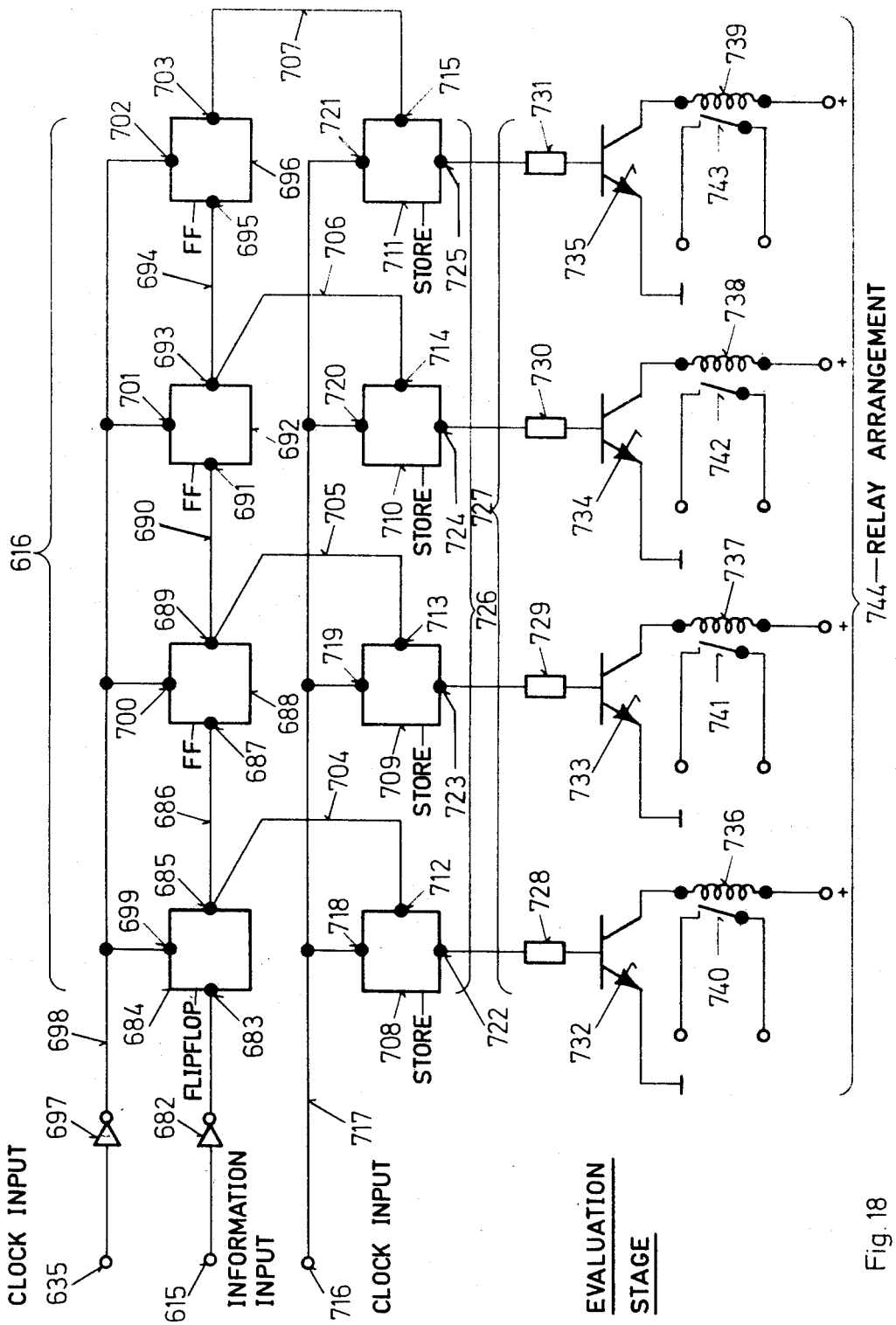
FIG. 18 is a circuit diagram of an evaluation stage.

An embodiment of an evaluating arrangement for the pulse sequence at the output 613 of the discriminator 612, corresponding to the information originally transmitted, will now be described with reference to FIG. 18.

According to FIG. 14, this evaluating arrangement has an information input 615 to which the pulse sequence obtained through the discriminator is delivered for evaluation. The pulse or impulse sequence from the input 615 is inverted by means of the following inverter 682, and delivered to the data input 683 of a first flip-flop 684. The output 685 of the first flip-flop 684 is connected through a line 686 to the dtat input 687 of a second flip-flop 688. The output 689 of the second flip-flop 688 is connected through a line 690 to the data input 691 of a third flip-flop 692. Finally, the output 693 of the third flip-flop 692 is delivered through a line 694 to the data input 695 of a fourth flip-flop 696. All four flip-flops 684, 688, 692 and 696 together form the shift register 616 to which the necessary shift clock impulses are delivered through a line 698. These shift clock impulses are delivered from the clock generator 629 (cf. FIG. 14) through the line 634 to the clock input 635. The shift clock impulses pass through a following inverter 697 and a line 698 to the clock inputs 699, 700, 701 and 702 of the four stages of the shift register 616. Stores 708, 709, 710 and 711 are associated with each of the outputs 685, 689, 693 and 703 of the four shift register stages through lines 704, 705, 706 and 707, for temporarily storing the information present in the shift register stages associated with them.

When it is retrieved, the information delivered through the line 704 to the input 712 of the first store 708, through the line 705 to the input 713 of the second store 709, through the line 706 to the input 714 of the third store and through the line 707 to the input 715 of the fourth store, is transferred by a clock pulse to the storage arrangement 726. The command for transferring the information emanating from the shift register 616 to the storage arrangement 726 is given by a clock pulse transmitted from the clock generator 629 (cf. FIG. 14) through an input terminal 716 and a line 717 to the clock inputs 718 . . . . 721 of the four stores 708 . . . . 711.

A control arrangement 727 is associated with the storage arrangement 726. This control arrangement 727 comprises transistors 732 . . . . 735 which are controllable through four base resistances 728 . . . . 731 and in each of whose collector circuits a relay 736 . . . . 739 is incorporated. The objects to be controlled by the information transmited (cf. FIG. 4, line A) can be connected to the relay contacts 740 . . . . 743 of the relay arrangement 744.

The clock generator 629 (cf. FIG. 14) can be the same as the clock generator already described in detail with reference to FIG. 5 so that there is no need for further details on this subject.

To sum up, it can be said that the method according to the invention and the arrangement by which it is carried out afford considerable advantages over conventional systems, including in particular the following:

1. The troublesome spillover effect is satisfactorily eliminated by using angle modulation, especially the frequency-shift keying and a limiter at the receiving end.

2. The use of the extremely narrow-band receiving arrangement described above, especially the narrow-band discriminator, also makes the system substantially immune to variable interference frequencies of the kind produced in power supply systems when motors are started up, because the residence time of the interference effect caused by such motors in terms of frequency within the band width of the discriminator has been shown by experience to be too small to give rise to disturbances.

3. The follow-up effect at the transmitting and receiving emd, i.e. binding the frequencies and transmission characteristics to the mains frequency, not only provides for an extremely narrow-band and hence interference-immune transmission system, it also affords considerable advantages in manufacturing terms because there is now no longer any need for the troublesome and expensive tuning work required by conventional LC-filters and because the basically very narrow-banded filters are resistant to ageing.

4. The receiver shows extremely high dynamics in regard to the input signal, so that the difficulties of projection encountered in conventional ripple-control systems in regard to minimum and maximum response level of the receiver and transmitter levels at different points of the power supply system completely disappear.

5. Despite the considerable improvement in safety of transmission, the transmiter level can be drastically reduced, for example from the present level of 25 to 50 kW per substation to around 100 . . . . 2,000 W, depending upon the efficiency of the coupling-in system which is provided. This also results in considerably lower plant costs and operating costs at the transmitting end.

6. By virtue of the drastic reduction in transmitting level on the power supply system, for example a signal power of only about 10 W has to be fed into the power supply system, a bar-type current transformer can be used for feeding in the signal power, which provides for a coupling-in method that is almost completely resistant to short-circuits, which is of considerable significance in regard to the operational reliability of installations using power current.

While there is shown and described present preferred embodiments of the invention, it is to be distinctly understood that the invention is not limited thereto but may be otherwise variously embodied and practiced within the scope of the following claims.

Accordingly, what is claimed is:

1. A method for remote-control through a power supply system and incorporating a transmitting end and a receiving end, comprising the steps of generating control commands signals, angle modulating said control commands signals upon a carrier, superimposing said control commands signal on the carrier at the transmitting end upon a power line of the power supply system, removing the angle-modulated control commands signals at any desired point of the power supply system, discriminating and evaluating such removed angle-modulated control commands signals, maintaining the transmitter frequencies in a fixed relationship to the mains frequency of the power supply system and to thus follow its fluctuations, controlling the response frequency of a receiver at the receiving end for the control commands signals as a function of the mains frequency of the power supply system such that it follows its fluctuations in the same manner as the transmitter frequencies, and selectively coupling the signals out of the power supply system at the receiving end, and subjecting the coupled-out signals to amplitude limiting prior to discrimination thereof according to their modulation.

2. The method as defined in claim 1, including the step of transmitting the control commands in the form of frequency-shift keyed signals, and maintaining the modulation index smaller than 1.

3. The method as defined in claim 1, including the step of controlling the discriminator frequency characteristic at the receiving end as a function of the mains frequency of the power supply system in a manner that it follows the signal frequencies dependent upon the mains frequency in the event of fluctuations in the mains frequency.

4. The method as defined in claim 1, including the step of spectrally rating the received and limited receiving signal at the receiving end for frequency discrimination, and delivering a frequency-discriminated signal to an amplitude-rating stage.

5. The method as defined in claim 1, including the stpe of maintaining the signal transmitting level at the transmitting end so as to be at least 60 dB below the rated power of the power supply system used for transmission.

6. The method as defined in claim 2, wherein at the receiving end the −3 db-band width is at most equal to one and one-half times the frequency shift.

7. The method as defined in claim 2, further including the step of producing a first transmitting frequency or a multiple thereof by bringing the oscillator frequency of a controllable oscillator into a fixed relationship to the mains frequency by phase comparison of a first auxiliary frequency obtained from the oscillator frequency by frequency division with a first divisor with a reference frequency which itself is maintained in a fixed relationship with the mains frequency, and obtaining a second transmitting frequency in the same manner as the first transmitting frequency, but with the selection of a second divisor, and bringing such second transmitting frequency into a fixed but different relationship with the mains frequency.

8. The method as defined in claim 6, further including the step of automatically reversing the frequency division as a function of and in time with a pulse sequence representing the information to be transmitted.

9. An arrangement for carrying out remote control operations through a power supply system, comprising a transmitting end and a receiving end, said transmitting end including means for producing control commands signals, angle-modulator means and transmitter means for angle-modulating the control commands signals upon a carrier for superimposing the control commands signals upon a power line of the power supply system via said transmitting means, coupling means for coupling the transmitter means at the transmitting end to the power line of the power supply system use for transmission, said receiving end including at least one receiver means connected to at least one arbitrary point of the power supply system, said receiver means comprising selecting means for the signals to be received, amplitude limiter and evaluating means following and in circuit with an angle modulation discriminator means, wherein said transmitter means at the transmitting end comprises means for maintaining each transmitted frequency in a fixed relationship with the mains frequency of the power supply system, and wherein said receiving end includes means for controlling the response frequency of the receiver means as a function of the mains frequency such that the response frequency of the receiver means bears the same fixed relationship to the mains frequency as the frequency of the transmitter means.

10. The arrangement as defined in claim 9, wherein said discriminator means comprises a frequency discriminator.

11. The arrangement as defined in claim 9, wherein said transmitter means comprises a frequency modulation transmitter provided at the transmitting end.

12. The arrangement as defined in claim 9, wherein said transmitter means comprises a transmitter for binary angle modulation provided at the transmitting end.

13. The arrangement as defined in claim 9, wherein said transmitter means comprises a transmitter for producing frequency-shift keyed signals provided at the transmitting end.

14. The arrangement as defined in claim 9, wherein said transmitter means comprises a transmitter for angle modulation with a modulation index of less than 1 provided at the transmitting end.

15. The arrangement as defined in claim 9, further including a control system operatively associated in circuit with at least part of the selecting means at the receiver end for maintaining the transmission characteristic of at least part of the selecting means at the receiving end in the same fixed relationship to the mains frequency as is the case with the transmitting frequency.

16. The arrangement as defined in claim 9, wherein said receiver means is provided with amplitude limiter means for the incoming signal which is coupled out of the power supply system.

17. The arrangement as defined in claim 9, further including a control system operatively associated in circuit with the discriminator means of the receiver means for maintaining its transmission characteristic in the same fixed relationship to the mains frequency as is the case with the transmitting frequency.

18. The arrangement as defined in claim 9, wherein the discriminator means at the receiving end contains a filter whose resonance frequency coincides with one of two transmitting frequencies occurring during frequency-shift keying and whose transmission characteristic has a narrower band than that of a receiving filter preceding it.

19. The arrangement as defined in claim 18, further including a threshold-value stage following and in circuit with said narrower-band filter of said discriminator means for evaluating the amplitude of the output signal of such filter.

20. The arrangement as defined in claim 9, further including a first controllable oscillator with an operatively associated phase-locked loop provided at the transmitting end for producing a reference frequency bound to the mains frequency.

21. The arrangement as defined in claim 20, further including a second controllable oscillator operativey associated with a phase-locked loop provided at the transmitting end for producing a first and second transmitting frequency bound to said reference frequency and thus to the mains frequency, a frequency divider provided in the phase-locked loop, said frequency divider including menas rendering the same reversible to a first divisor for producing the first transmitting frequency and to a second divisor for producing the second transmitting frequency.

22. The arrangement as defined in claim 21, wherein said reversible means for the frequency divider renders said frequency divider electronically reversible by a control signal delivered to a control input thereof, a coder for delivering a pulse sequency corresponding to the information to be transmitted, said coder having an output, said control input of the frequency divider being connected to said output of said coder.

23. The arrangement as defined in claim 15, wherein said selecting means at the receiving end comprises a sampling filter controllable by a clock pulse sequence, a clock pulse generator for generating said clock pulse sequence provided for said sampling filter, said clock pulse generator generating a clock pulse sequence whose frequency is maintained in a fixed relationship to the mains frequency.

24. The arrangement as defined in claim 23, wherein said sampling filter comprises an N-path filter.

25. The arrangement as defined in claim 24, wherein an active RC-filter is operatively connected in circuit with said N-path filter.

26. The arrangement as defined in claim 17, wherein said discriminator means comprises a sampling filter controllable by a clock pulse sequence, a clock pulse generator provided for the sampling filter for delivering said clock pulse sequence, said clock pulse generator generating a clock pulse sequence whose frequency is maintained in a fixed relationship to the mains frequency.

* * * * *

UNITED STATES PATENT OFFICE
CERTIFICATE OF CORRECTION

PATENT NO. : 3,986,121
DATED : October 12, 1976
INVENTOR(S) : URS OEHRLI

It is certified that error appears in the above-identified patent and that said Letters Patent are hereby corrected as shown below:

Column 2, line 23, read "pahse" as --phase--.

Column 7, line 8, read "accordint" as --according--.

Column 7, line 62, read "circuts" as --circuits--.

Column 26, line 32, read "hich" as --which--.

Column 31, line 18, read "stpe" as --step--.

Column 31, line 39, read "claim 6" as --claim 7--.

Column 31, line 54, read "use" as --used--.

Column 32, line 44, read "band" as --bandwidth--.

Signed and Sealed this

Eighth Day of March 1977

[SEAL]

Attest:

RUTH C. MASON
Attesting Officer

C. MARSHALL DANN
Commissioner of Patents and Trademarks